United States Patent
Le Pennec et al.

(10) Patent No.: US 6,986,051 B2
(45) Date of Patent: Jan. 10, 2006

(54) METHOD AND SYSTEM FOR CONTROLLING AND FILTERING FILES USING A VIRUS-FREE CERTIFICATE

(75) Inventors: Jean-Francois Le Pennec, Nice (FR); Olivier Hericourt, Cagnes/Mer (FR)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 09/753,773

(22) Filed: Jan. 2, 2001

(65) Prior Publication Data

US 2002/0016925 A1 Feb. 7, 2002

(30) Foreign Application Priority Data

Jan. 6, 2000 (EP) .................................. 00480003

(51) Int. Cl.
*H04L 9/00* (2006.01)
*H04L 9/32* (2006.01)
*G06F 11/30* (2006.01)
*G06F 12/14* (2006.01)

(52) U.S. Cl. .................... 713/188; 726/24; 726/19; 726/21; 713/156; 713/175; 713/176

(58) Field of Classification Search ................ 713/155, 713/156, 177, 188, 200, 201, 175, 176; 380/30; 707/9; 714/38
See application file for complete search history.

(56) References Cited

U.S. PATENT DOCUMENTS

| | | | | |
|---|---|---|---|---|
| 5,606,609 A | * | 2/1997 | Houser et al. ............... 713/179 |
| 5,699,431 A | * | 12/1997 | Van Oorschot et al. ........ 380/30 |
| 5,781,629 A | * | 7/1998 | Haber et al. ................. 713/177 |
| 6,021,510 A | * | 2/2000 | Nachenberg .................. 714/38 |
| 6,088,803 A | * | 7/2000 | Tso et al. .................... 713/201 |
| 6,092,194 A | * | 7/2000 | Touboul ...................... 713/200 |
| 6,094,731 A | * | 7/2000 | Waldin et al. ................. 714/38 |
| 6,154,844 A | * | 11/2000 | Touboul et al. .............. 713/201 |
| 6,233,577 B1 | * | 5/2001 | Ramasubramani et al. ..... 707/9 |
| 6,275,937 B1 | * | 8/2001 | Hailpern et al. ............. 713/188 |
| 6,301,658 B1 | * | 10/2001 | Koehler ....................... 713/155 |
| 6,321,333 B1 | * | 11/2001 | Murray ....................... 713/156 |
| 6,480,962 B1 | * | 11/2002 | Touboul ...................... 713/200 |
| 6,577,920 B1 | * | 6/2003 | Hypponen et al. .......... 700/200 |
| 6,892,303 B2 | * | 5/2005 | Le Pennec et al. .......... 713/188 |

* cited by examiner

*Primary Examiner*—Ayaz Sheikh
*Assistant Examiner*—Christian La Forgia

(57) ABSTRACT

The present invention is directed to computer viruses and more particularly to a method and system for use in a virus-free certificate firewall, of controlling and filtering files using a virus-free certificate. An example embodiment of the method comprises the steps of: receiving a file; if a virus-free certificate (200) is required for the file: determining whether the a virus-free certificate is already associated with the file; if a virus-free certificate is already associated with the file: authenticating the associated virus-free certificate, said virus-free certificate comprising a certificate signature; if the virus-free certificate is authenticated, determining whether the file is virus-free or not; if the file is virus-free, forwarding the file with the associated virus-free certificate; if the virus-free certificate is not authenticated or if no virus-free, certificate is associated with the file; determining whether the file is virus-free or not, if the file is virus-free, associating with the file a new virus-free certificate; and forwarding the file with the new virus-free certificate.

16 Claims, 11 Drawing Sheets

VIRUS-FREE CERTIFICATE (200)

| | |
|---|---|
| (201) | FILE NAME |
| (202) | ISSUER |
| (203) | PUBLIC KEY VALUE |
| (204) | VALIDITY |
| (205) | SERIAL NUMBER |
| (206) | CERTIFICATE SIGNATURE |
| (207) | FILE SIGNATURE |
| (208) | ANTIVIRUS CHECKER 1 |
| | |
| | ANTIVIRUS CHECKER n |
| (209) | CERTIFICATE STRUCTURE |

FIG. 2

METHOD AND SYSTEM FOR CONTROLLING AND FILTERING FILES USING A VIRUS-FREE CERTIFICATE

TECHNICAL FIELD

The present invention relates to computer viruses and more particularly to a method and system for controlling and filtering files using an virus-free certificate.

BACKGROUND ART

Among all computing and networking security issues, the most important cause of concern does not come from intrusions, but from the widespread proliferation of viruses. Viral infections represent the great majority of all security incidents.

Virus Protection

Virus protection for large organizations has become more and more complex and difficult because of:
  the combined use of heterogeneous systems and practices,
  the widespread use of distributed or client/server systems, and
  the free exchange of data files via network sharing, e-mail, Internet . . .

Until recently, viral infections threatened only data residing on storage media, such as hard drives and floppy disks. However, with the emergence of macro viruses, the threat has spread to applications. Most organizations are not aware of this level of penetration and are not organized to manage and prevent virus attacks. An effective virus protection software must prevent infections rather than simply treating them after they have already occurred. Anti-virus solutions need a uniform plan, with a centralized control, automated virus signature updates, and support for multiple platforms, protocols, and file types.

Computer Viruses

A computer virus is any program created to reproduce itself. A virus reproduces itself by attaching itself to programs, files, or even to boot sectors of disks. A virus is activated when the infected file or disk is opened or accessed. Once a virus resides in a memory, it can attach itself to the next file or disk accessed, and so on. A virus may be designed to do harm. A virus may also have unintended consequences by overwriting important computer information and by causing costly inconveniences to users and network managers. There are four general types of computer virus:
  File Viruses (including macro viruses), which are attached to files;
  Boot sector Viruses in which the boot sectors of floppy or hard disks are infected;
  Master Boot Record (MBR) Viruses which infect the disk master boot record; and
  Multi-partite Viruses that are a combination of a file virus and a boot sector virus.

Virus Disguises

Viruses need to avoid detection in order to succeed in corrupting target computers. Simple viruses, with easily detectable signatures are giving way to more sophisticated virus types:
  Polymorphic Viruses: they change their signature, or profile, each time they are activated so that a fixed signature filter will miss them.
  Stealth Viruses: they attempt to hide their presence by intercepting interrupt services and by feeding back false information to anti-virus products and end users.
  Encrypted Viruses: they are delivered within an encrypted file and are undetectable by a simple anti-virus.

Sources of Infection

Every improvement in network and communication technologies opens new avenues through which viruses can infect your system. Most of former viruses were boot sector viruses, in which the boot sectors of floppy or hard disks were infected.

Macro Viruses

As stated earlier, the creation of macro viruses has changed this environment dramatically. A macro virus is a set of instructions comprising powerful macro routines initially designed for word processing and spreadsheet applications. These macro languages enable a myriad of useful functions which can be imbedded into a document and which can be executed when the document is opened for view or use.

Internet

With the exploding development of the Internet, viruses have catastrophic possibilities. The Internet introduces two different virus threats.
  The first threat is caused by the download of files comprising viruses when these files are browsed or transferred using for instance FTP (File Transfer Protocol) routines. Public shareware (shared software) and executable routines of all types, including formatted presentations, are a growing source of virus infection. Furthermore, new Internet virus threats are beginning to appear in the form of malicious JAVA and Active-X applets.
  The second threat comes from electronic mail (e-mail). Most Internet e-mail systems provide a very rich capability to attach formatted documents to mail sent over the network. These e-mail messages can be broadcast to individuals or groups of individuals with the simple stroke of a key! Infected documents or files can flood a corporate network through gateways and mail servers. As networking, telecommunications, remote access, message systems supporting attachments of all kinds become more and more common, viruses will exploit these new electronic pathways to attack systems that were heretofore unreachable.

Groupware Complications

A third trend in networking also exacerbates the virus threat: the trend towards the deployment of Groupware applications such as Lotus Notes, Microsoft Exchange, Novell Groupwise, etc.

Since the active and repeated sharing of documents over the network is at the core of these applications, they represent a fertile ground for the deployment of macro viruses. A Groupware application not only acts as a repository for shared documents, but, due to its collaborative function, it simultaneously broadcasts files to associated work groups. The broadcast of files significantly multiplies the possibility of accidentally deploying mail infected by attached macro viruses and makes Groupware protection a high priority.

Symptoms of Virus Infection

Most viruses attempt to remain undetected as long as possible to extend their destructive influence. Therefore, most viruses do not produce any recognizable profile or signature that would allow to trap them by scanning the software. However, viruses perform actions that do not look like normal computer operations or user operations. These abnormal actions can be detected by intelligent anti-virus software. Fortunately, many viruses have telltale symptoms and may inadvertently give off signals that can alert users and virus protection software to their presence.

Some of these symptoms include:
Increase in byte length of files,
Alterations of a file's time stamp,
Delayed program loading or activation,
Reduced performance,
Lower system resources, available memory, disk space,
Bad sectors on floppies and hard drives,
Strange or non-standard error messages,
Non-standard screen activity, display fluctuations,
Program inoperability (failing to execute),
Incomplete or failed system boots, and
Uninitiated drive writes.

ANTI-VIRUS SOFTWARE OVERVIEW

Detecting a Virus

Viruses are becoming increasingly sophisticated and, as such, can defeat simpler, single dimension software packages. To be effective, the anti-virus software must include special-purpose, distributed applications. Applications can detect viruses using five distinct methods:

Signature Scanning: This method compares the content of files against a database of virus signatures. This method requires frequent updates of the database to ensure the identification of new and changing signatures.

Integrity Checking: This method compares the profile of current files and disk areas against an archived snap shop of these same items. The detected differences may indicate the presence of a virus. Check summing is the most common type of integrity checking. Unfortunately, integrity checking is generally not effective against modern stealth viruses, so further detecting means are needed.

Heuristic Analysis: An artificial intelligence monitors virus-like behavior, such as trapping certain interrupt services or attempting unlikely actions such as reformatting the hard disk.

Polymorphic Analysis: Polymorphic viruses are difficult to detect because they constantly change their look, particularly when they are encrypted or when they use stealth techniques to hide their presence. A polymorphic analyzer will move any suspect file to a separate, protected, location in the computer and will execute it there to see if it exhibits any virus-like behavior.

Macro Virus Analysis: A specifically designed anti-virus software detects macros in files and tests them before execution.

Archived and Compressed Files

In addition to the support of these five types of virus analysis, an effective anti-virus system must also be able to scan archived and compressed files. Zip (or Pkzip) and Microsoft Compression are the most common tools for archiving and compressing a file. A virus can hide inside a compressed archive, and can remain dormant or unnoticed until the infected file is extracted and released into a system. The minimum for an efficient anti-virus system is to be able to scan most current types of archives to identify viruses stored within the files they contain.

Frequency of Database Signature Update

Finally, the ability of a virus software to prevent virus attacks is determined by its ability to maintain an updated virus signature database. Any anti-virus software must have an associated, easily accessible Web site, or some other online source of information, where regular virus database updates can be retrieved. Products that automate this update process by using an Internet connection to regularly collect new information have a clear advantage in this regard.

Real Time and Scheduled Virus Scanning

Most anti-virus software can perform a scan of a computer in order to detect and possibly treat the viruses found at that time. This process is called scanning. Scanning a computer for viruses can occur:

at regular intervals under the control of a scheduler, or
as an on-demand operation manually executed, or
as an event-activated operation (usually in response to some recognizably "illegal" behavior by a potential virus). In addition, viruses can be detected in real time, when they are received. This capability is important because if viruses can be detected when they attempt to enter within a system (computer, data repository, server . . . ), then it is possible to prevent them from corrupting other files. Oftentimes, a scheduled scan may occur after a virus has already entered within a computer and has corrupted other files. Obviously, the earlier a virus can be detected, the better.

To be truly useful, an anti-virus software must have the ability to perform all types of scans.

Certificate

A Certificate is a structure that contains a public value (i.e. a public key) associated with an identity. For instance, within a X.509 Certificate, the public key is bound to a "user's name". A third party (a Certificate Authority) attests that the public key belongs to the user. A X.509 Certificate is a very formal structure and comprises different elements:

Subject: This is the "user's name" (the Subject can be any identity value).
Issuer: This is the name of the third party that has issued/generated the certificate. This third party is the Certificate Authority (CA).
Public Key Value: This is the public key of a public/private key pair. An associated field defines the public key algorithm that must be used, for instance a RSA, Diffie-Hellman or DSA public key.
Validity: Two fields are used to define the period of validity (valid from date 1 and valid to date 2).
Serial Number: This field provides a unique Certificate serial number for the issuer.
Signature: The signature is an encrypted digest generated by the Certificate Authority (CA) for authenticating the whole certificate. The digest results from the hashing of the Certificate. The digest is encrypted using the CA private key. The encrypted digest which is the signature, "certifies" that the Subject is the "owner" of the public and private keys.

Certificate Verification

The Certificate needs to be verified to ensure that it is valid. This is a quite complex process. The verification by an end user of a Certificate comprises the checking of the following elements:

Valid (or any) Subject and Issuer names are defined in the Certificate.

The Certificate is not expired (checking of the Validity period field).

The Certificate has not been revoked (this may be determined by obtaining a current Certificate Revocation List from the CA).

The signature on the Certificate is valid (the signature is not verified by using the Certificate's public key but by using the CA public key).

The method for validating the signature is quite simple, and comprises the steps of:

extracting the issuer's name (CA name) from the Certificate;

locating the issuer's Certificate (CA Certificate) or the issuer's public key (CA public key).

checking that the end user's Certificate signature was generated by the issuer (CA) using the issuer's public key (CA public key).

Certificates are generated by a Certificate Authority (CA). Two main methods can be used:

Centralized Generation: The private/public key pair is generated by the end user (defined in the subject field of the Certificate). The public key is directly provided by the end user to the CA software to create a Certificate. The Certificate can be provided to another end user via any suitable channel. The channel does not have to be secure because a Certificate is a self protecting structure (given the CA's signature).

Distributed Generation: The private/public key pair is generated by the end user. The end user requests the CA to build a Certificate including the end user public key. The public key is then sent to the CA for certification. If the request is valid then the CA returns a Certificate associating the user identity with the user public key to the end user.

Of course these two methods can be combined in any system, because trusted CA keys are generated by the Certificate Authority (CA).

OBJECTS OF THE INVENTION

Current anti-virus method are becoming more and more complex due to:

the number of viruses, the difficulty to find them, and the fact that their signature can change with time or environment.

Virus are coming from everywhere and especially from the Internet network. The time required to check a disk within a computer system, becomes more and more important. Furthermore, the checking of a disk involves the use of resources which may prevent the normal use of the computer system.

It is an object of the present invention to improve current anti-virus checking methods and to provide a new method using file Certificates similar to X.509 Certificates used to authenticate an identity. A specific process associates a Certificate, called virus-free Certificate (VC), with a file in order to speed up and improve the virus detection.

It is another object of the present invention is to reduce the consumption of resources (for instance, the CPU—Central Processing Unit) and to reduce the time necessary to detect viruses within files. This reduction is especially important on systems handling a huge amount of traffic (for instance IP Routers or Firewalls). The performance of such systems is highly impacted by usual anti-virus checkers because usual checkers require to process each file. The detection of viruses on said systems is a very complex process and must be done as fast as possible.

It is another object of the invention, when a system requires a virus-free Certificate for a particular file, to retrieve this virus-Free Certificate as fast as possible, for obvious performance reasons. Copies of existing virus-free Certificates are stored instead of being rebuilt each time they are required. Retrieving an existing Virus-free Certificate is more efficient (saves time and provides better performances) than rebuilding a new virus-free Certificate. Within a network, multiple authorities can be used to build a virus-free Certificate for a particular file. They can share, for instance, the load of building virus-free Certificates and can use different anti-virus checkers. An authority among these multiple authorities must be identified when a virus-free Certificate has to be retrieved.

SUMMARY OF THE INVENTION

The present invention relates to computer viruses and discloses a method and system for controlling and filtering files using a virus-free Certificate. The virus-free Certificate associated with each file comprises in a file signature. The signature is generated by a trusted server (a Virus-free Certificate Authority—VCA) which avoids the system which receives the file to check this file for all existing virus. The Virus-free Certificate Authority validates the file against all known viruses, using one or several anti-virus checkers. In case of new viruses, only the virus-free Certificates is changed and the only process performed by the system receiving the file (typically a network device) is to verify the file against the signature included in the virus-free Certificate, and to filter the file according to predetermined rules. The present invention drastically simplify the computing resources used for detecting viruses on network devices such as IP Routers and Firewalls. Files on Web Servers can be downloaded with their anti-virus Certificates suppressing the risk of virus. The full anti-virus is processed once on the Virus-free Certificate Authority instead of being processed on each system. Since the processing resources required on the system are limited (because the anti-virus checker is processed on the Virus-free Certificate Authority and not on the network device), the performance impact on the system is also limited.

An example embodiment of the present method comprises the steps of:

receiving a file;

If a virus-free certificate is required for the file:

determining whether the a virus-free certificate is already associated with the file;

If a virus-free certificate is already associated with the file:

authenticating the associated virus-free certificate, said virus-free certificate comprising a certificate signature;

If the virus-free certificate is authenticated:

determining whether the file is virus-free or not:

If the file is virus-free:

forwarding the file with the associated virus-free certificate;

If the virus-free certificate is not authenticated or if no virus-free certificate is associated with the file:

determining whether the file is virus-free or not:

If the file is virus-free:

associating with the file a new virus-free certificate;

forwarding the file with the new virus-free certificate.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein FIG. 1 describes the different entities involved in the anti-virus system according to the present invention;

FIG. 2 describes the content of a virus-free Certificate according to the present invention;

PREFERRED EMBODIMENT OF THE INVENTION

Introduction

Figure 1:
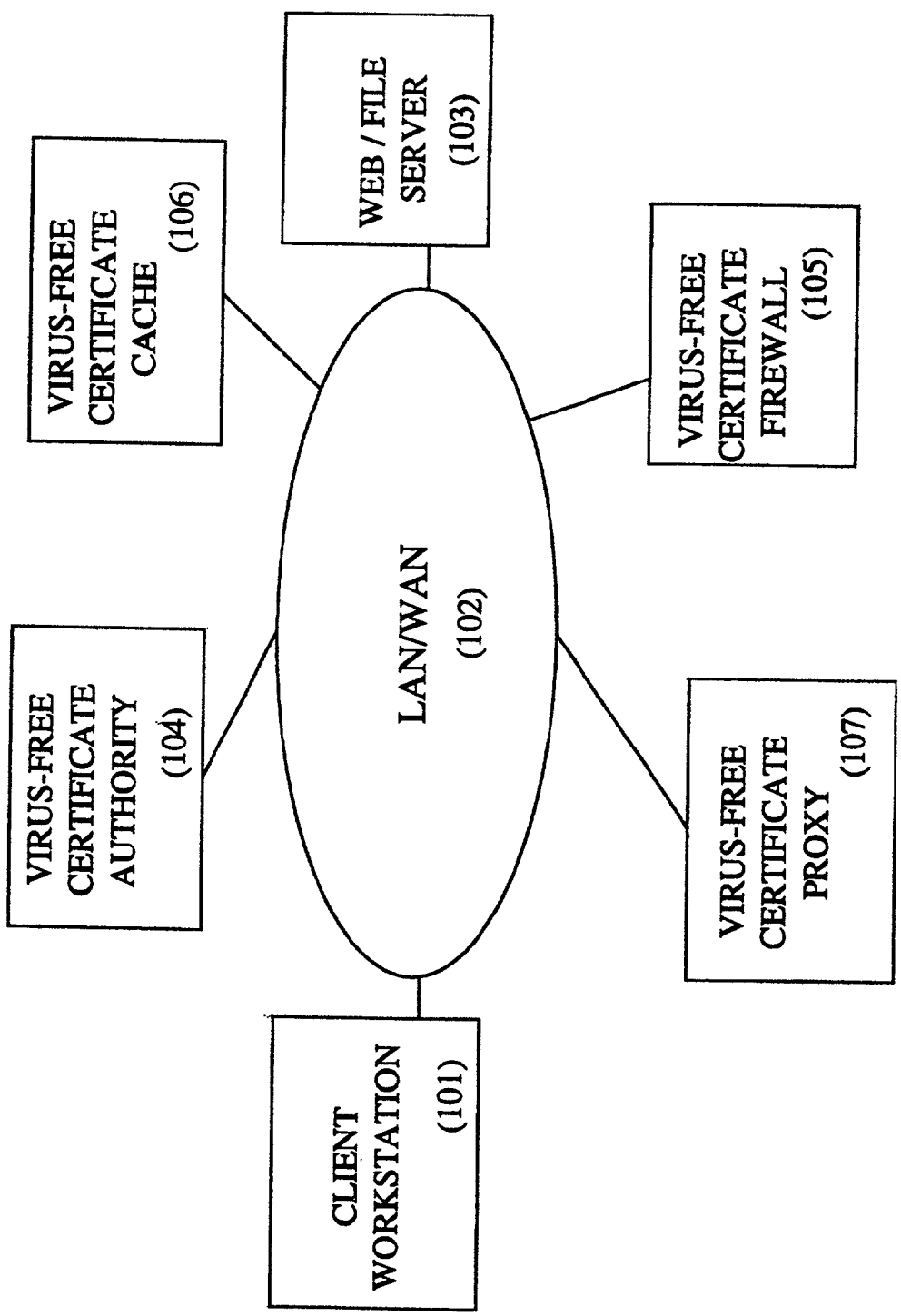

FIG. 1 describes the different entities involved in the virus system disclosed in the present invention. In most of the cases, the file that the Client Workstation (101) requires is stored in a File Server (for instance a WEB Server) (103). A Certificate is associated with this file on the File Server (103). The Certificate indicates that the file has been processed by a list of anti-virus programs (also referred to as anti-virus checkers), and is virus free. It is an object of the Virus-free Certificate Authority (VCA) (104) to build such Certificates (called Virus-free Certificates—VC). The Client Workstation, the File Server, the Virus-free Certificate Authority are attached to a LAN/WAN network (102) (Local Area Network/Wide Area Network). which can include the Internet network.

The Client workstation (101) downloads the file and the associated anti-virus Certificate from the File Server (103) through a network device within the WAN/LAN network. Said network device is for instance:

an IP (Internet Protocol) Router which routes files between File Servers and Client Workstations, a Firewall protecting the secure side of the LAN/WAN network (typically the Client Workstations attached to an Intranet network) from the unsecured side of the LAN/WAN network (typically the File Servers attached to the Internet network).

The network device controls and filters each file it receives, according to some anti-virus criteria. For that, it uses:

predefined rules, and the virus-free Certificate associated with each file.

The network device therefore protects the Client Workstations from viruses. This network device is called Virus-free Certificate Firewall (also referred to as VCF) (105).

Virus-free Certificate Firewall

Depending on some predefined rules, a Virus-free Certificate Firewall (VCF) may have to add a Virus-free Certificate to a file it receives from a File Server. In this case, the Virus-free Certificate Firewall retrieves the virus-free Certificate from a Virus-free Certificate Cache (VCC) (106). If the virus-free Certificate cannot be retrieved from a Virus-free Certificate Cache, the Virus-free Certificate Firewall retrieves the Virus-free Certificate from a Virus-free Certificate Proxy (107).

Virus-free Certificate Cache

A Virus-free Certificate Cache (VCC) (106) is used to store existing Virus-free Certificates within the LAN/WAN network. These Virus-free Certificates can be retrieved by systems attached to the LAN/WAN network (typically the Virus-free Certificate Firewall). Retrieving an existing Virus-free Certificate is a more efficient operation (in term of performance) than building a new Virus-free Certificate.

Multiple Virus-free Certificate Caches can be attached to the LAN/WAN network. In this case, the multiple Virus-free Certificate Caches communicate across the LAN/WAN network in order to exchange the Virus-free Certificates.

Virus-free Certificate Proxy

A Virus-free Certificate Proxy (VCP) (107) acts as a single Virus-free Certificate Authority (VCA) within the LAN/WAN network in order to provide virus-free Certificates to any system attached to the LAN/WAN network. When multiple Virus-free Certificate Authorities (VCAs) are available (for instance, one VCA per software vendor), the Virus-free Certificate Proxy (VCP) identifies a Virus-free Certificate Authority (VCA) which has authority for building a Virus-free Certificate for of a particular file, and retrieves the Virus-free Certificate from said identified Virus-free Certificate Authority (VCA).

Virus-free Certificate Retrieval

Any system attached to the LAN/WAN network can retrieve a virus-free Certificate (VC) for a specific file from either:

A Virus-free Certificate Authority (VCA), which builds the VC. The virus-free Certificate (VC) is said to be "authoritative" because the Virus-free Certificate Authority (VCA) has authority to build a valid VC, using for instance the latest anti-virus programs and levels.

A Virus-free Certificate Proxy (VCP), which relays the request for virus-free Certificate (VC) to one or multiple Virus-free Certificate Authorities (VCAs). Since a Virus-free Certificate Proxy (VCP) dynamically retrieves "authoritative" virus-free Certificates (VCs) from VCAs, it also provides "authoritative" virus-free Certificates (VCs).

A Virus-free Certificate Cache (VCC). A VCC has not authority to build virus-free Certificates (VCs) but it maintains local copies of virus-free Certificates (VCs).

Possibly, a virus-free Certificate (VC) retrieved from a Virus-free Certificate Cache (VCC) may be invalid. For instance, the virus-free Certificate (VC) is expired since it was initially built by a Virus-free Certificate Authority (VCA). A Virus-free Certificate Cache (VCC) does not provide "authoritative" virus-free Certificates (VCs).

Virus-free Certificate

FIG. 2 describes the content of a virus-free Certificate (VC) according to the present invention. The virus-free Certificate reuses the standard X.509 Certificate format. It comprises the signature of the file and therefore is bound to this file. The main difference between a X.509 Certificate and the virus-free Certificate is that the virus-free Certificate comprises:
- an anti-virus name and level;
- a signature of the file.

The virus-free Certificate (200) includes the following fields:

File name (201): This is the "name" of the file protected that the virus-free Certificate protects.

Issuer (202): This is the "name" of the third party that issued/generated the virus-free Certificate. This third party is the Virus-free Certificate Authority (VCA).

Public Key Value (203): This is the public key of a public/private key pair. An associated field defines the public key algorithm that must be used to check the file signature, for instance a RSA , Diffie-Hellman or DSA public key. The public key is provided by the Virus-free Certificate Authority. The corresponding private key is used by the VCA to build the signature of files. So the same private/public key pair may be used to build several virus-free Certificates from the same issuer (VCA). This public key within the virus-free Certificate is preferably used instead of the Virus-free Certificate Authority public key used to validate only the present certificate signature and not the file signature. A public key for decrypting the imbedded signature is added within the virus-free Certificate because the Virus-free Certificate Authority public key is generally longer and more complex. The validity of keys may also differ between the Virus-free Certificate Authority public key and the virus-free Certificate public key. Anyway, because the virus-free Certificate is signed by the Virus-free Certificate Authority, the use of the virus-free Certificate public key is secure.

Validity (204): Two fields are used to define the period of validity (valid from date 1 and valid to date 2).

Serial Number (205): This field provides a unique virus-free Certificate serial number for the issuer.

Certificate Signature (206): The certificate signature is an encrypted digest generated by the Virus-free Certificate Authority (VCA) for authenticating the whole Certificate. The digest results from the hashing of the virus-free Certificate. The digest is encrypted using the Virus-free Certificate Authority (VCA) private key. The certificate signature results from the encrypted digest and "certifies" that the file signature is encrypted by the private key associated with the virus-free certificate public key (203). The Virus-free Certificate Authority (VCA) public key is different from the virus-free Certificate public key and is either preloaded in the web browser or given by a trusted entity. The VCA public key is used to retrieve the original hashing of the full certificate. The Virus-free Certificate Authority (VCA) can use the same set of virus-free certificate private/public keys (203) for all the files generated during a given period of time so the cross-checking of the issuer authentication can be easily performed time to time, when a new set of keys is used. Once the virus-free Certificate public key for a issuer is validated, it can be reused for several files certified by the same issuer which reduces the number of virus-free Certificate public keys.

File Signature (207): The File Signature is verified using the public key value given in the virus-free Certificate. The file signature (hashing) performed by the Virus-free Certificate Authority (VCA) on the file is encrypted using the VCA private key. Using the VCA public key allows to retrieve the original file signature.

Anti-virus Checker (208): This field gives an indication of how the virus-free Certificate has verified that the file was virus-free. The Anti-virus Checker comprises the name and the level of the anti-virus program. Several anti-virus programs and levels may be appended to reinforce the efficiency of the anti-virus detection.

Certificate Structure (209): This field describes the size and the content of the virus-free Certificate fields. The number or anti-virus program is defined in this field.
- If the virus-free Certificate uses a standard format (minimum size of a virus-free Certificate), this field is optional.
- If the size of the virus-free Certificate is above the size of the standard format (above the minimum size), this field is mandatory and defines the size of the fields comprised in the virus-free Certificate.

Virus-free Certificate Rules Table

Figure 3:
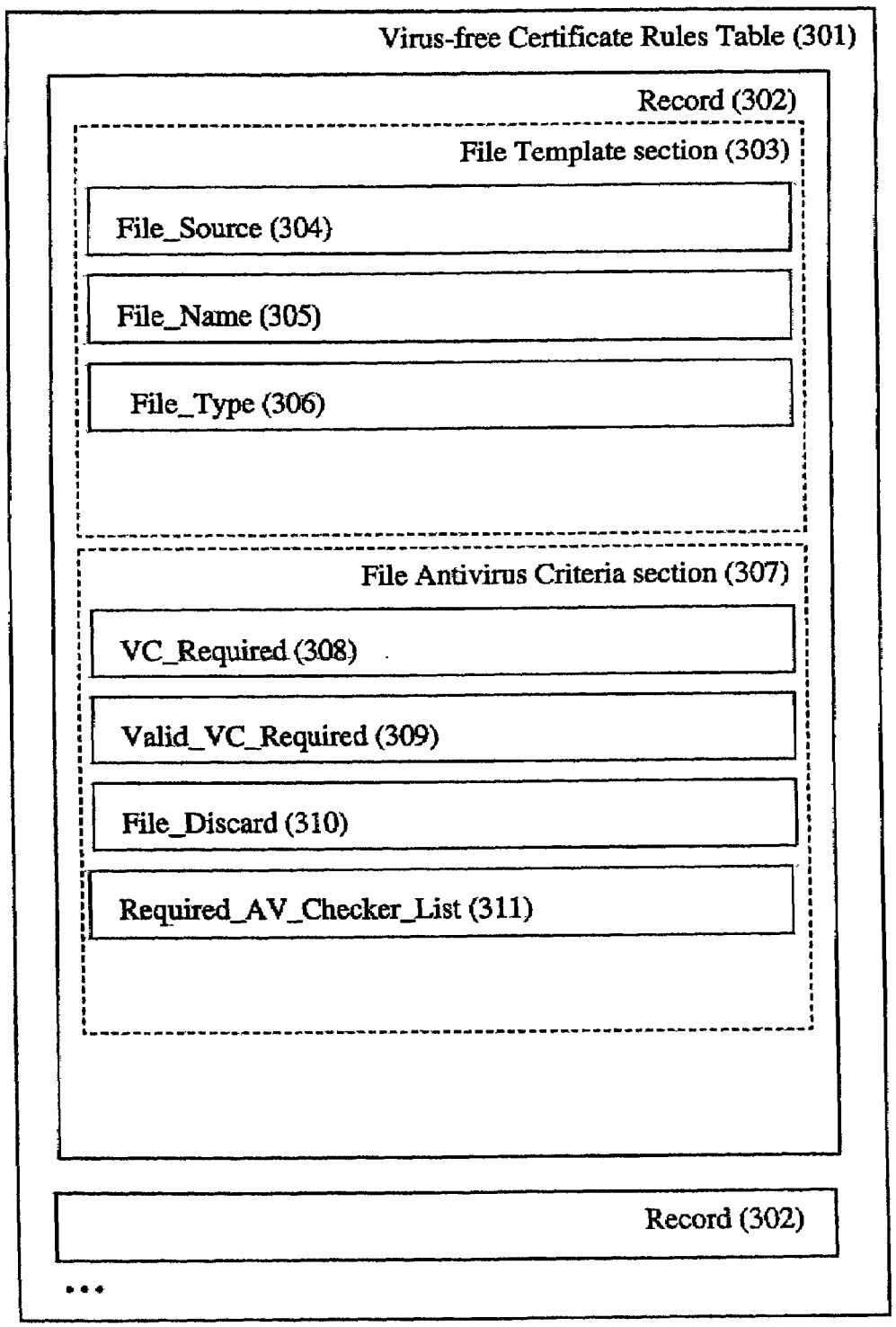
FIG. 3 describes the Virus-free Certificate Rules Table according to the present invention.

FIG. 3 describes the table used by the Virus-free Certificate Firewall (VCF) (105). Said table provides some indications for controlling and filtering the files received by the Virus-free Certificate Firewall (VCF). This table is called Virus-free Certificate (VC) Rules Table (301). The Virus-free Certificate Table (301) (a flat file in a preferred embodiment) is typically created by the Network Administrator in charge of the LAN/WAN network. This table associates with each file some anti-virus criteria. Said anti-virus criteria are used by the Virus-free Certificate Firewall (VCF) for controlling and filtering of each file.

Each file is identified by its characteristics (303), which can be one or a combination of the following information:
- the source system which has originated the file,
- the file name,
- the file type,
- optionally, the file size,
- optionally, the file CRC (a file signature).

The anti-virus criteria (307) associated with each file comprise:
- an information indicating whether or not a Virus-free Certificate is required for this file,
- an information indicating a list of information comprised within a virus-free Certificate (VC) and that must be check to determine that the virus-free Certificate (VC) is valid,
- an information indicating whether or not the file must be discarded, when a virus-free Certificate (VC) is required for this file, and when either:
  - no Virus-free Certificate is associated with the file, or
  - the Virus-free Certificate which is associated with the file, is not valid.
- a list of anti-virus programs and levels that must be used for building the Virus-free Certificate associated with the received file. Typically, this list of anti-virus programs and levels is used by the authority (a Virus-free Certificate Authority) which builds the virus-free Certificate (VC).

The Virus-free Certificate Rules Table (301) comprises a list of records (302). In order to minimize the number of records in the table, files having the same characteristics are grouped within file templates (303). The anti-virus criteria comprised within one record, apply to all files within the file template. There is one record for each file template, each record comprising the following information:

- (303) a File Template section, which comprises the following information (fields in the record):
  - (304) File_Source: This is the identifier of the source system or the plurality of source systems that have originated files. For instance, the File_Source can be the IP address of the File Server which has originated all files within a specific software company (for instance the IP address of www.ibm.com File Server).
  - (305) File_Name. This is the name of one or multiple files. The File_Name can be either:
    - an explicit file name which identifies a unique file. For instance a File_Name with the value "setup1" identifies the file called "setup1".
    - a wildcarded file name which identifies multiple files. For instance, File_Name with the value "setup*" identifies any file which name starts with "setup" (for instance "setup1", "setup_ok", . . . ).
  - (306) File_Type. This is the type of the file (for instance "exe", "doc" "avi", "html", . . . ). A File_Type identifies any file of this type. For instance, a File_Type with the value "exe" identifies all files which type is "exe" (for instance "start.exe", "word.exe", . . . ).

Optionally, the File Template section can also comprise a file size. The file size is then the size of all files within the same File Template. The file size can possibly used to differentiate files having the same File_Source, File_Name, and File_Type.

Optionally, the File Template section can also comprise a file CRC (a file signature). The file CRC is then the signature of the file identified by the File Template. The file CRC can possibly used to differentiate files having the same File_Source, File_Name, and File_Type.

- (307) a File Anti-virus Criteria section, which comprises the following information (fields in the record):
  - (308) VC_Required. This information indicates whether or not a Virus-free Certificate must be associated with any file within the file template. The possible values of VC_Required are "yes' and "no".
  - (309) Valid_VC_Required. This information indicates the list of information comprised within a virus-free Certificate (VC) and which must be validated by the Virus-free Certificate Firewall (VCF) in order to determine that the virus-free certificate (VC) is valid. For instance, a virus-free Certificate (VC) with an expired date may be considered as valid. This information applies to any file within the file template. By default, all information comprised within a virus-free Certificate (VC) must be checked and validated by the Virus-free Certificate Firewall (VCF) in order to determine that the virus-free Certificate (VC) is valid.
  - (310) File_Discard. This information indicates whether or not the file must be discarded, when "VC_Required" is set to "yes", and when either:
    - no Virus-free Certificate is associated with the file, or
    - the Virus-free Certificate which is associated with the file, is not valid.

The possible values are "yes" and "no".
  - (311) Required_AV_Checker_List. This is the list of anti-virus programs and levels which must be used for the anti-virus processing of any file within the file template. Said list is therefore the list of anti-virus programs and levels that must be used by the authority (typically a VCA) which builds the Virus-free Certificate associated with any file within the file template.

A default record is defined in the Virus-Free Certificate Rules Table. This default record comprises anti-virus criteria that must be used by the Virus-free Certificate Firewall (VCF) for processing files which are not explicitly listed in a specific record.

Virus-free Certificate Firewall

According to the present invention, a purpose of a Virus-free Certificate Firewall (VCF) is to control and filter each file it receives, according to some anti-virus criteria and using Virus-free Certificates. For each file it receives, the Virus-free Certificate Firewall (VCF) performs the following operations:

- retrieving the anti-virus criteria for said received file, from the Virus-free Certificate Rules Table (301),
- checking whether or not said received file is associated with a Virus-free Certificate,
- checking whether or not the Virus-free Certificate which is associated with said received file, is valid, based on said anti-virus criteria,
- when required by said anti-virus criteria, retrieving a valid Virus-free Certificate associated with said file. Typically, said Virus-free Certificate is retrieved either from a Virus-free Certificate Authority (VCA), or from Virus-free Certificate Cache (VCC) or from a Virus-free Certificate Proxy (VCP),
- discarding the file, when the anti-virus criteria are not satisfied.
- forwarding the file, possibly along with its associated valid Virus-free Certificate, when the anti-virus criteria are satisfied.

Typically, the Virus-free Certificate Firewall (VCF) is either a dedicated network device attached to the LAN/WAN network, or an existing network device (for instance an existing Firewall) which is enhanced to provide the Virus-free Certificate Firewall (VCF) functions.

Figure 4:
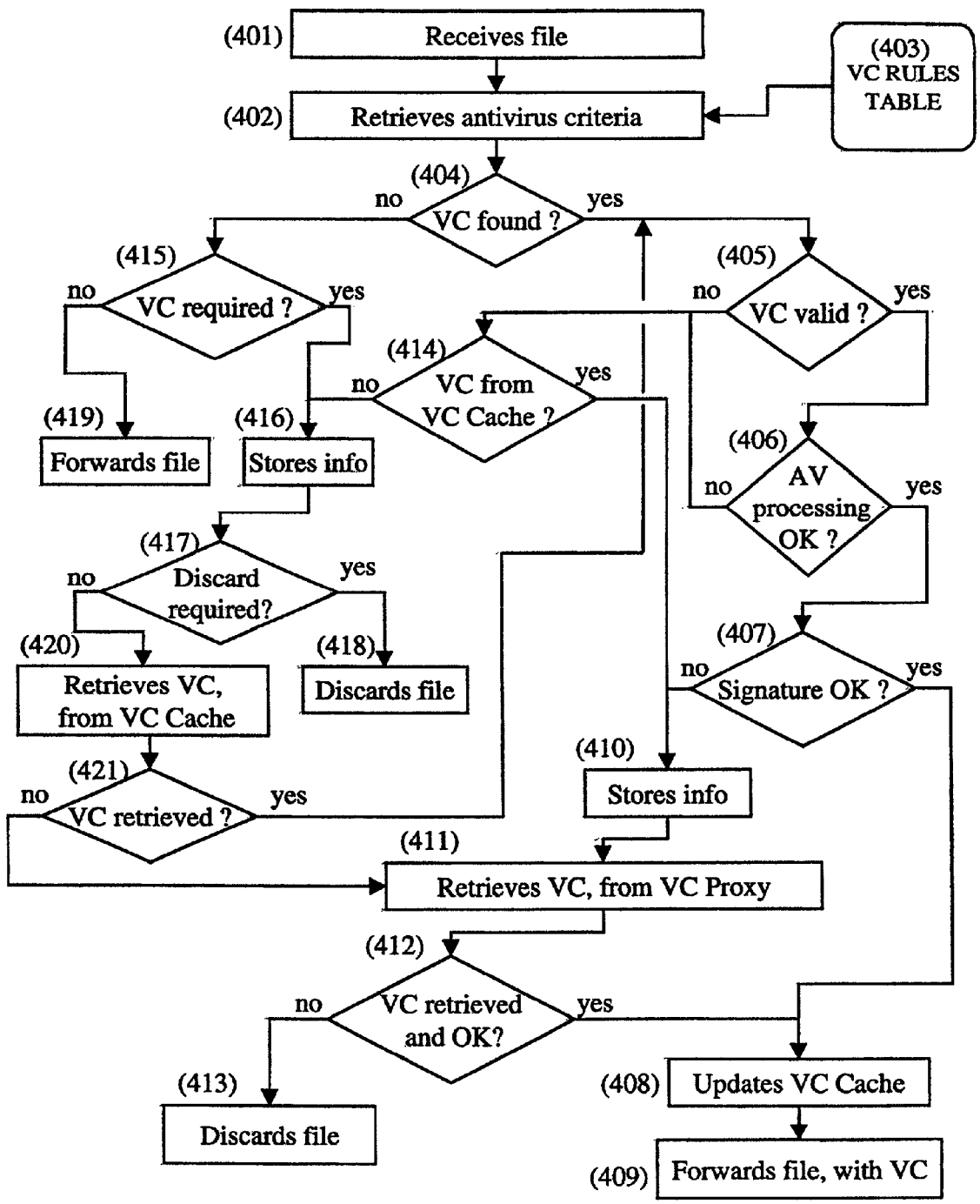
FIG. 4 describes the internal logic of a Virus-free Certificate Firewall according to the present invention.

FIG. 4 is a flow chart which refers to the internal logic of the Virus-free Certificate Firewall (VCF). The VCF:

- (401): receives a file
- (402): retrieves the anti-virus criteria associated with the file, from the Virus-free Certificate Rules Table (403). Said file anti-virus criteria are comprised in the VC Rules Table record which is associated with the received file. Said record is identified using its "File_Source", "File_Name", and "File_Type" fields, and using information retrieved from the received file (its name, its type, and its source which is typically identified by the IP address of the system which originated the file). Typically, the anti-virus criteria are comprised in the fields ("VC_Required", "Valid_VC_Required", "File_Discard", and "Required_AV_Checker_List") of the file anti-virus criteria section of the identified record.
- (404): tests whether or not a Virus-free Certificate (VC) is associated with the received file. Preferably, the virus-free Certificate (VC) has been received within the file or through separate means.

If a virus-free Certificate (VC) is found:
  (405) tests whether or not the received virus-free Certificate (VC) is valid. Typically, and by default, the VC is valid when all the following conditions are satisfied:
    The VCA which has issued the VC, and identified by the "issuer" field of the VC, is a trusted VCA. Typically, this is done by checking that the VCA is comprised within a list of trusted VCAs This list is configured on the VCF by a Network Administrator.
    The VC is authenticated using:
    its "certificate signature" field and
    the public key of the VCA which has issued the VC.
    Typically, the VCF retrieves said public key from a list of trusted VCA certificates which have been placed on the VCF by a Network Administrator, or which have been retrieved by the VCF through secure means.
    The VC date is correct. Typically, the current date is comprised in the date interval provided in the "validity" field.
    The VC has not been revoked. Typically, this is done using:
      the "issuer" and the "serial number" fields of the VC, and
      a certificate revocation list (CRL) issued by the VCA.
    Possibly, the "Valid_VC_Required" indication retrieved from the VC Rules Tables in step (402), indicates the list of the above conditions that must be satisfied. For instance, "Valid_VC_Required" may indicate that a VC with an expired date is considered as valid.
If the virus-free Certificate (VC) is valid:
  (406) tests whether or not the anti-virus processing of the file is OK. This anti-virus processing consists in checking that the VCA which issued the VC has tested the file for viruses. This checking uses at least the list of required anti-virus programs and levels comprised in the file anti-virus criteria.
    The list (List1) of anti-virus programs and levels used by the VCA to test the file for viruses is retrieved from the "anti-virus checker" fields of the VC.
    The list (List2) of anti-virus programs and levels that must be used to test the file for viruses, is retrieved from the "Required_AV_Checker_List" field of the file anti-virus criteria section of the selected record (said selected record has been retrieved in (402) from the VC Rules table).
  By default, the anti-virus processing is OK when List2 is a subset of List1. Possibly, the "Valid_VC_Required" indication which has been retrieved from the VC Rules Tables in step (402), indicates if the anti-virus processing is OK when:
    Both List1 and List2 are identical, or
    List2 is a subset of List1 (this is the default).
If the anti-virus processing is OK:
  (407) tests whether or not the file signature is OK. This test compares the file signature calculated by the VCF and the file signature comprised within the VC (in the "file signature" field). If both are the same, then the file signature is OK, which means that the received file has not been modified since it was checked for viruses by the VCA.
If the file signature is OK:
  (408) updates a Virus-free Certificate (VC) Cache. An update request comprising the file VC, is sent to a VC Cache by the VCF. Said request typically comprises the file name and type, the file size, the file CRC, and the file Virus-free Certificate. Preferably, the address of a VC Cache is a predefined parameter of the VCF. This step is optional, and is obviously only done when a VC Cache has been defined within the LAN/WAN network.
  (409) forwards the received file, along with its valid VC.
  The VCF then waits for the next file to process in (401).
If the file signature is not OK:
  (410) stores an information indicating that the file signature is not OK (or any other detected error).
  (411) retrieves a VC from a Virus-free Certificate (VC) Proxy. The VCF sends a request to a VC Proxy, in order to retrieve a VC associated with the received file. Said VC is authoritative since it is built and issued by a VCA. Possibly, the VCF retrieves an authoritative VC directly from a VCA, when no VC Proxy is defined within the LAN/WAN network. Said request typically comprises:
    The file name and type, the file size (optional), and the file CRC.
    Optionally, a reduced VC which contains the "issuer" information. Said "issuer" information identifies the preferred VCA, and provides the VCP with some selection criteria which can be used when multiple VCs are available for the same file (typically, one VC per VCA).
    Optionally, a list of anti-virus checkers, that should preferably be used by the VCA to build the VC.
  Preferably, the address of the VC Proxy (or VCA) is a predefined parameter of the VCF.
  (412) tests whether or not a valid VC has been retrieved. A VC may have been retrieved from the VCP (or VCA) in step 411. Said VC is tested to make sure it is valid and has not been corrupted for instance by a malicious system stealing the identity of a trusted VCA. The VC is validated using the same criteria and possibly the "Valid_VC_Required" indication, as in steps (405), (406), and (407). Typically, the test determines that:
    The VCA which has issued the VC is a trusted VCA.
    The VC is authenticated.
    The VC date is correct.
    The VC has not been revoked.
    The anti-virus processing is OK.
    The file signature is OK.
  If a valid VC has been retrieved:
    (408) updates a Virus-free Certificate (VC) Cache.
    (409) forwards the received file, along with its valid VC. The VCF then waits for the next file to process in (401).
  If a valid VC has not been retrieved:
    (413) discards the file, and stores an information which indicates the discard and that a valid VC has not been retrieved. The VCF then waits for the next file to process in (401).
If the anti-virus processing is not OK:
  (414) tests whether or not the VC has been retrieved from a VC Cache. The information indicating that the VC has been retrieved from a VC Cache is set in step (420).
  If the VC has been retrieved from a VC Cache (in step (420))

Continues in step (410), in order to possibly retrieve an authoritative VC from a VC Proxy (or VCA).

If the VC has not been retrieved from a VC Cache
Continues in step (416), in order to possibly retrieve a VC from a VC Cache.

If the VC is not valid:
Continues in step (414), in order to possibly retrieve a valid VC, either from a VC Proxy (or VCA) or from a VC Cache.

If a VC is not found:
(415) tests whether or not a VC is required for the received file. The test uses the "VC_Required" indication retrieved from the VC Rules Table in step (402).

If a VC is required for the received file:
(416) stores an information indicating an error condition. Possibly, a file which should have a VC has been received without a VC, or a file has been received with an invalid VC.
(417) tests whether or not the file must be discarded. The test uses the "File_Discard" indication retrieved from the VC Rules Table in step (402). The file must be discarded when "File_Discard" is set to "yes", and when "VC_Required" is set to "yes", and when either:
no VC is associated with the file, or
the VC which is associated with the file, is not valid.

If the file must be discarded:
(418) discards the file, and stores an information which indicates the discard. The VCF then waits for the next file to process in (401).

If the file must not be discarded:
(420) retrieves a VC from a Virus-free Certificate (VC) Cache. The VCF sends a request to a VC Cache, in order to retrieve a VC associated with the received file. Said request typically comprises:
The file name and type, the file size (optional), and the file CRC.
Optionally, a reduced VC which contains the "issuer" information. Said "issuer" information identifies the preferred VCA, and provides the VCC with some selection criteria which can be used when multiple VCs are available for the same file (typically, one VC pr VCA).
Optionally, a list of anti-virus checkers. Said list indicates the list of anti-virus checkers that should preferably be used to build the VC, and provides the VCC with some selection criteria which can be used when multiple VCs are available for the same file (typically, one VC per VCA).
Preferably, the address of the VC Cache is a predefined parameter of the VCF. This step is optional, and is obviously only done when a VC Cache has been defined within the VCF.
(421) tests whether or not a VC has been retrieved from a VC Cache:

If a VC has been successfully retrieved from a VC Cache:
Continues in step (405) in order to validate the retrieved VC. Since the VC has been retrieved from a VC Cache, the VC is not authoritative and must be validated. An indication that the VC has been retrieved from a VC Cache is also stored for internal use (in step (414)).

If a VC has not been successfully retrieved from a VC Cache:
Continues in step (411) in order to retrieve an authoritative VC from a VC Proxy (or from a VCA).

Virus-free Certificate Cache Table

Figure 5:
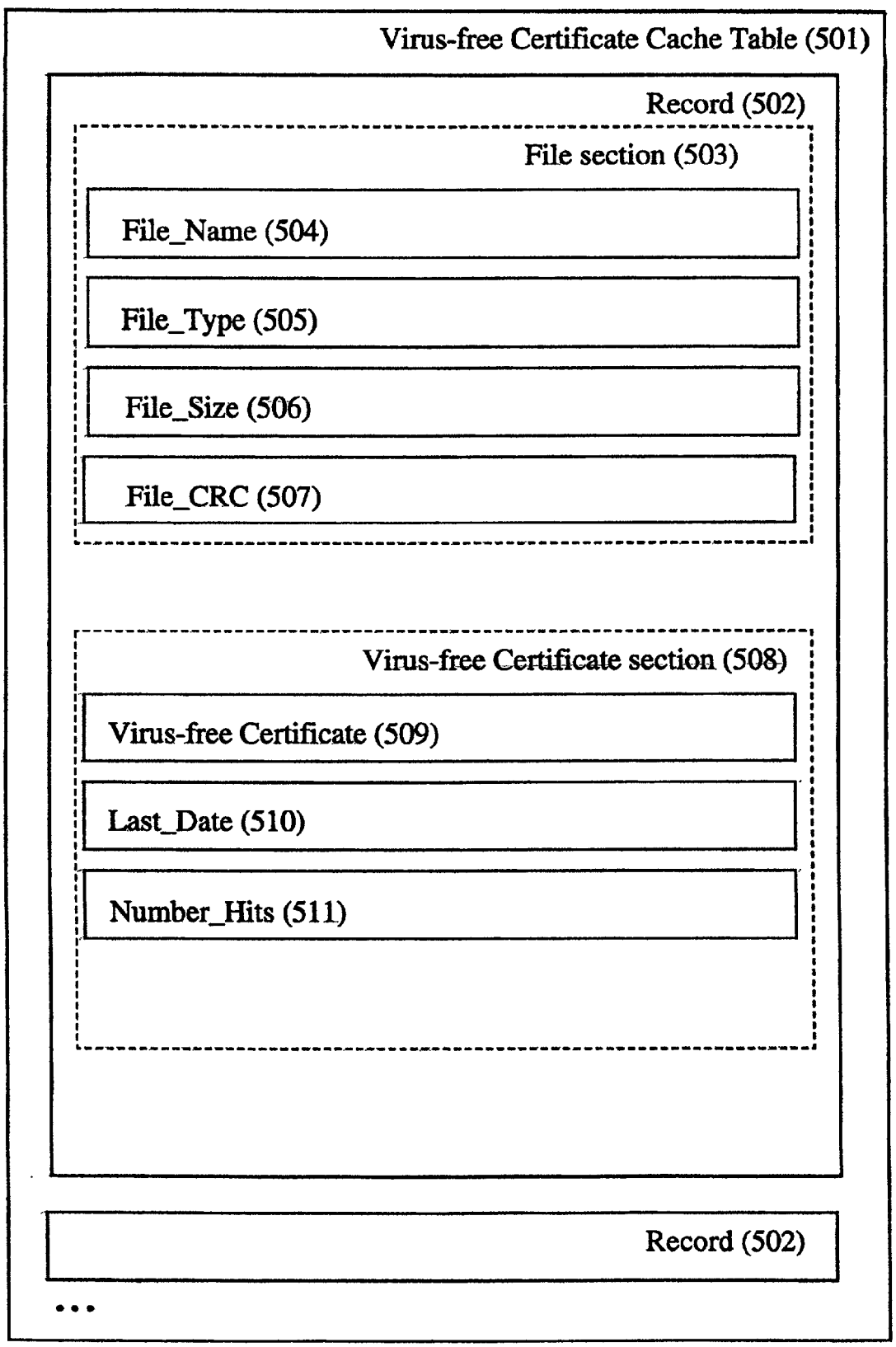
FIG. 5 describes the Virus-free Certificate Cache Table according to the present invention.

FIG. 5 describes the table used by the Virus-free Certificate Cache (VCC) (106). This table, called Virus-free Certificate Cache Table, is dynamically built by the VCC and comprises a local copy of Virus-free Certificates which have been transmitted through the LAN/WAN network. The table (501) comprises for each file, one or multiple associated Virus-free Certificates.

In the VC Cache Table (501), each file is identified by its characteristics (503), which are:
the file name,
the file type,
optionally, the file size,
the file CRC.

In the VC Cache Table, each file is associated with one or multiple VC sections (508), each VC section comprising the following information:
The VC associated with this file,
The date of the latest request to retrieve said VC,
The number of requests (hits) to retrieve said VC.

The table comprises a list of records (502). There is one record for each file, each record comprising the following information:
(503) a File section comprising the following information (fields in the record):
(504) File_Name. This is the name of the file. Typically, this is the explicit file name. For instance a File_Name with the value "setup1" identifies the file called "setup1".
(505) File_Type. This is the type of the file (for instance "exe", "doc", "avi", "html", . . . ).
(506) File_Size. This is the size of the file. This field is optional.
(507) File_CRC. This is the CRC (a file signature) of the file.
The combination of File_Name and File_Type may identify in a unique way one file.
If multiple files have the same name and type (for instance, multiple "setup.exe" files originated from multiple sources), each one of these said file may then be differentiated in a unique way by its file size (for instance the size of one "setup.exe" is 2 kilobytes, and the size of another "setup.exe" is 4 kilobytes).
If multiple files have the same name, type, and size, each one of these said file is then differentiated in a unique way by its file CRC which is a file signature (hashing)
(508) a Virus-free Certificate (VC) section comprising the following information (fields in the record):
(509) Virus-free_Certificate (VC). This is the VC associated with the file.
(510) Last_Date. This is the date of the latest request received by the VC Cache to retrieve or to update this VC. Typically, this date is used when the VC Cache is maintained and when for instance the oldest records have to be deleted.
(511) Number_Hits. This is the number of requests (hits) that have been received by the VC Cache to retrieve this VC. Typically, this number of hits is used when the VC Cache is maintained and when for instance the records with the lowest number of hits have to be deleted.

Possibly, multiple VC sections are associated with one file within the same record to support multiple VCs per file. This is for instance necessary when one file has one VC per VC Authority (VCA), each VC Authority using for instance one specific anti-virus program. In this case, each record is still identified by its File section, but multiple VC sections are then associated with said File section (one VC section per VC).

Virus-free Certificate Cache

According to the present invention, a Virus-free Certificate Cache (VCC) (106) stores existing Virus-free Certificates within the LAN/WAN network. Said existing Virus-free Certificates can then be retrieved by systems attached to the LAN/WAN network (typically the Virus-free Certificate Firewall). Retrieving an existing Virus-free Certificate is more efficient than building a new Virus-free Certificate, and therefore provides better performance.

Multiple Virus-free Certificate Caches can be attached to the LAN/WAN network. In this case, the multiple VCCs communicate across the LAN/WAN network in order to exchange the Virus-free Certificates.

The VC Cache performs the following functions:
  Storing copies for each file of the Virus-free Certificate (VC) or of the multiple Virus-free Certificates in a VC Cache Table.
  Processing each request for updating the VC Cache Table with a new Virus-free Certificate. This operation comprises the steps of:
    Dynamically updating a local VC Cache Table with a copy of said new Virus-free Certificate.
    Possibly updating one or multiple remote VC Cache Tables with said new Virus-free Certificate.
  Processing each request for retrieving a VC associated with a specific file. This operation comprises the steps of:
    Preferably retrieving a VC from a local VC Cache Table.
    Possibly retrieving a VC from a remote VC Cache Table.
  Maintaining the VC Cache Table, by discarding from the VC Cache Table the invalid VCs.
  Possibly pre-loading the VC Cache Table with one or multiple VCs which are directly retrieved from one or multiple VC Authorities or VC Proxies.

Furthermore, the operation of preferably retrieving a VC from a local VC Cache Table, comprises the following steps:
  Identifying a preferred VC in the VC Cache Table, using one or multiple selection criteria, said selection criteria comprising:
    the name of said specific file,
    the type of said specific file,
    optionally the size of said specific file,
    the CRC of said specific file,
    optionally a preferred list of anti-virus programs and levels,
    optionally the identifier of a preferred VCA.
  Retrieving said preferred VC from the VC Cache Table.

Typically, the VCC is either a dedicated network device attached to the LAN/WAN network, or an existing network device (for instance an existing WEB Proxy system) which is enhanced to provide the VCC functions.

Virus-free Certificate Cache Table Maintenance

The VCC periodically maintains the VC Cache Table. This operation comprises the following steps:
  Checking the validity of each VC in the VC Cache Table using the VC fields. Typically, this checking uses the "validity" and the "serial number" fields of the VC to determine if the VC has expired or if the VC has been revoked.
  Discarding from the local VC Cache Table:
    each VC section with an invalid VC,
    Each record with no VC section.

The VC Cache Table maintenance is preferably performed at regular time intervals, for instance every night. The maintenance process can be triggered either automatically or manually. The periodicity of said maintenance is for instance a predefined parameter of the VCC.

Optionally, the VC Cache can discard in one or multiple remote VC Cache Tables, records comprising a VC which is no longer valid. This operation is optional since preferably each VCC maintains its own local VC Cache Table, in order to avoid unnecessary traffic across the LAN/WAN network.

Virus-free Certificate Cache Table Pre-Loading

The VC Cache can pre-loads its local VC Cache Table with one or multiple VCs directly retrieved from one or multiple VC Authorities (VCAs) or VC Proxies (VCPs). In this case, the VC Cache is configured (typically by a Network Administrator) with a list of VCAs (or VCPs). The VC Cache periodically retrieves VCs from the VCAs within said list, and populates the VC Cache Table with records comprising said retrieved VCs.

Typically, the VC Cache can retrieve from a VCA one file (for instance using FTP) comprising the latest VCs created by said VCA. The VC Cache then creates one record in the VC Cache Table, for each VC comprised within said retrieved file. The pre-loading of the VC Cache Table is preferably performed at regular time intervals, for instance every night. The pre-loading process can be triggered either automatically or manually. The periodicity of said pre-loading is for instance a predefined parameter of the VCC.

Virus-free Certificate Cache: Virus Free Certificate Retrieval

Figure 6:
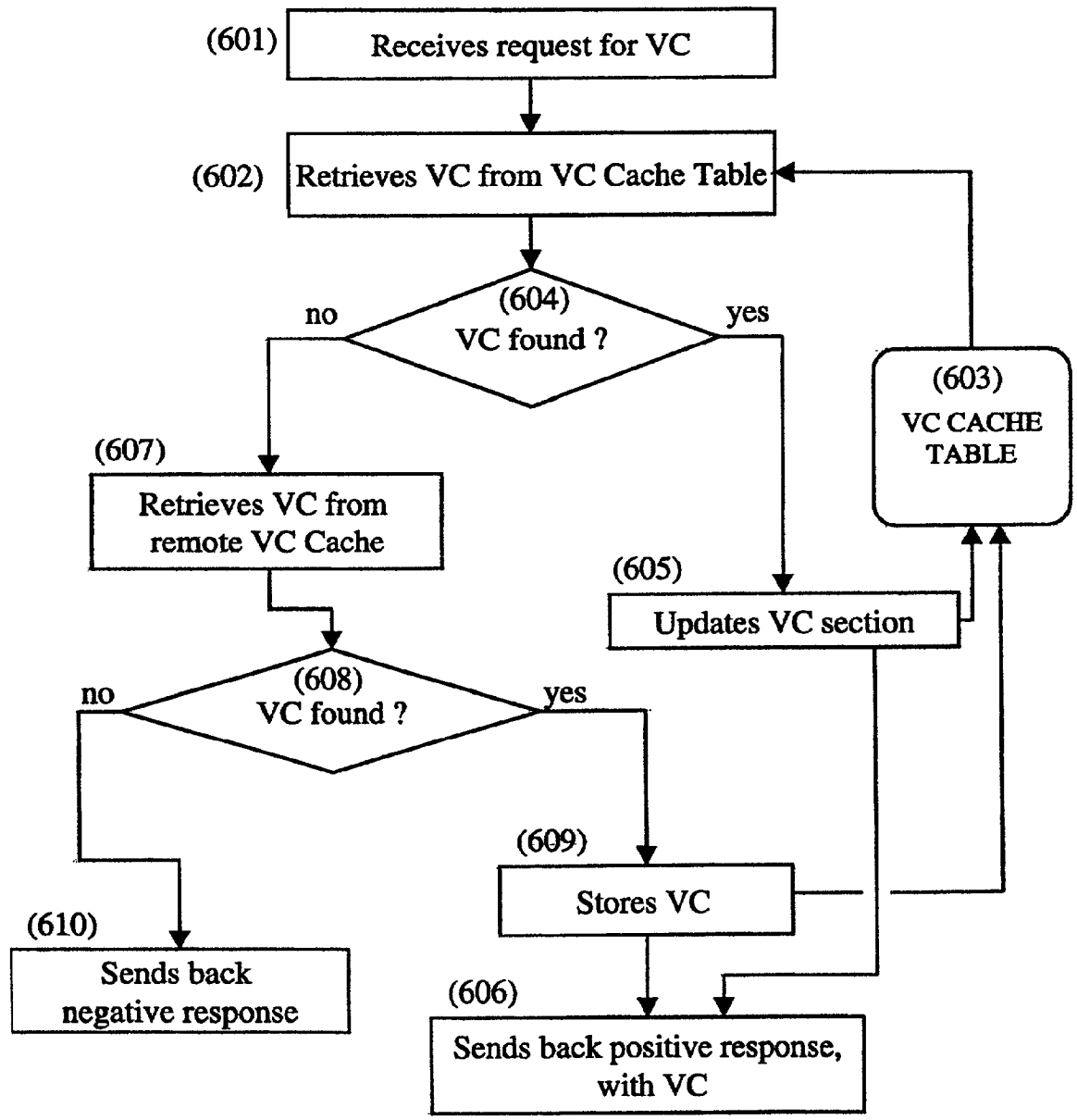
FIG. 6 describes the internal logic of the Virus-free Certificate Cache for retrieving a Virus-free Certificate according to the present invention.

FIG. 6 is a flow chart which refers to the internal logic of the Virus-free Certificate Cache (VCC) and more particularly to the method for processing a request for retrieving a VC for a particular file. The Virus-free Certificate Cache (VCC):
  (601): receives a request to retrieve a VC for a particular file. Typically, said request for VC typically comprises:
    The name, and type of the file,
    The size of the file (optionally),
    The CRC of the file. This is a file signature identifying the file.
    Optionally, the list of anti-virus programs and levels (referred to as "RCV_AV_Checker_List"), that should preferably be comprised within the list of anti-virus programs and levels which have been used to build the requested VC. Typically, this information is used by the VCC to select the preferred VC, when multiple VCs are available for the same file.
    Possibly, the list is empty, which means that any anti-virus program and level can be used.
    Optionally, a reduced VC comprising only the "issuer" field (referred to as "RCV_issuer"), and identifying the preferred VCA. The reduced VC then provides the VCC with some selection criteria. These selection criteria can be used when multiple VCs are available for the same file (typically, one VC available per VCA).
  (602) retrieves one VC from the VC Cache Table (603).
    Typically, this operation comprises the following steps:
    Selecting one record (called "Record_S") within the VC Cache Table, using:
      Its File_Name and File_Type, which must be identical to the file name and file type comprised in the received request.

If multiple records (files) have the same File_Name and File_Type (for instance, multiple "setup.exe" files originated from multiple sources), each record (file) can then be differentiated in a unique way by using the File_Size (for instance the size of one "setup.exe" is 2 kilobytes, and the size of another "setup.exe" is 4 kilobytes).

In the unlikely event of multiple records (files) having the same File_Name, File_Type, and File_Size, each record (file) is then differentiated in a unique way by using the File_CRC.

Selecting one VC within said selected record:
When only one VC section is comprised within "Record_S", the selected VC is the VC comprised within said VC section.

When multiple VC sections are comprised within "Record_S", each one comprising one VC, the selected VC is preferably identified using:
The "issuer" field of the VC. This issuer field is equal (or comprises) the "RCV_issuer" possibly received in the request.

The "Anti-virus Checker" fields of the VC. These Anti-virus Checkers are equal (or comprise) the "RCV_AV_Checker_List" possibly received in the request.

(604) tests whether or not a VC has successfully been retrieved from the VC Cache Table.

If a VC has been retrieved from the VC Cache Table
(605) updates in the VC Cache Table (603), the "Last_Date" and "Number_Hits" fields of the VC section comprising the VC.
Updates "Last_Date" with the current date
Increments "Number_Hits".
(606) answers the received request for VC, with a positive response comprising the retrieved VC. Optionally, the VC is validated before being sent back in the response. The VCC then waits for the next request for VC.

If a VC has not been retrieved from the VC Cache Table
(607) retrieves the VC from a remote VC Cache. The VCC forwards the received request to one or multiple VC Caches. The address of said VC Caches is typically a predefined parameter of the VCC.
(608) tests whether or not a VC has been retrieved from a remote VC Cache.

If a VC has successfully been retrieved from a remote VC Cache:
(609) stores said retrieved VC in the VC Cache Table. Either a new record is created in the VC Cache Table, or a new VC section is created in an existing record.
(606) answers the received request for VC, with a positive response comprising the VC which has been retrieved. Optionally, the VC is validated before being sent back in the response. The VCC then waits for the next request for VC.

If a VC has not been retrieved from a remote VC Cache:
(610) answers the received request for VC, with a negative response since no VC has been retrieved. The VCC then waits for the next request for VC.

Virus-free Certificate Cache Table Update

Figure 7:
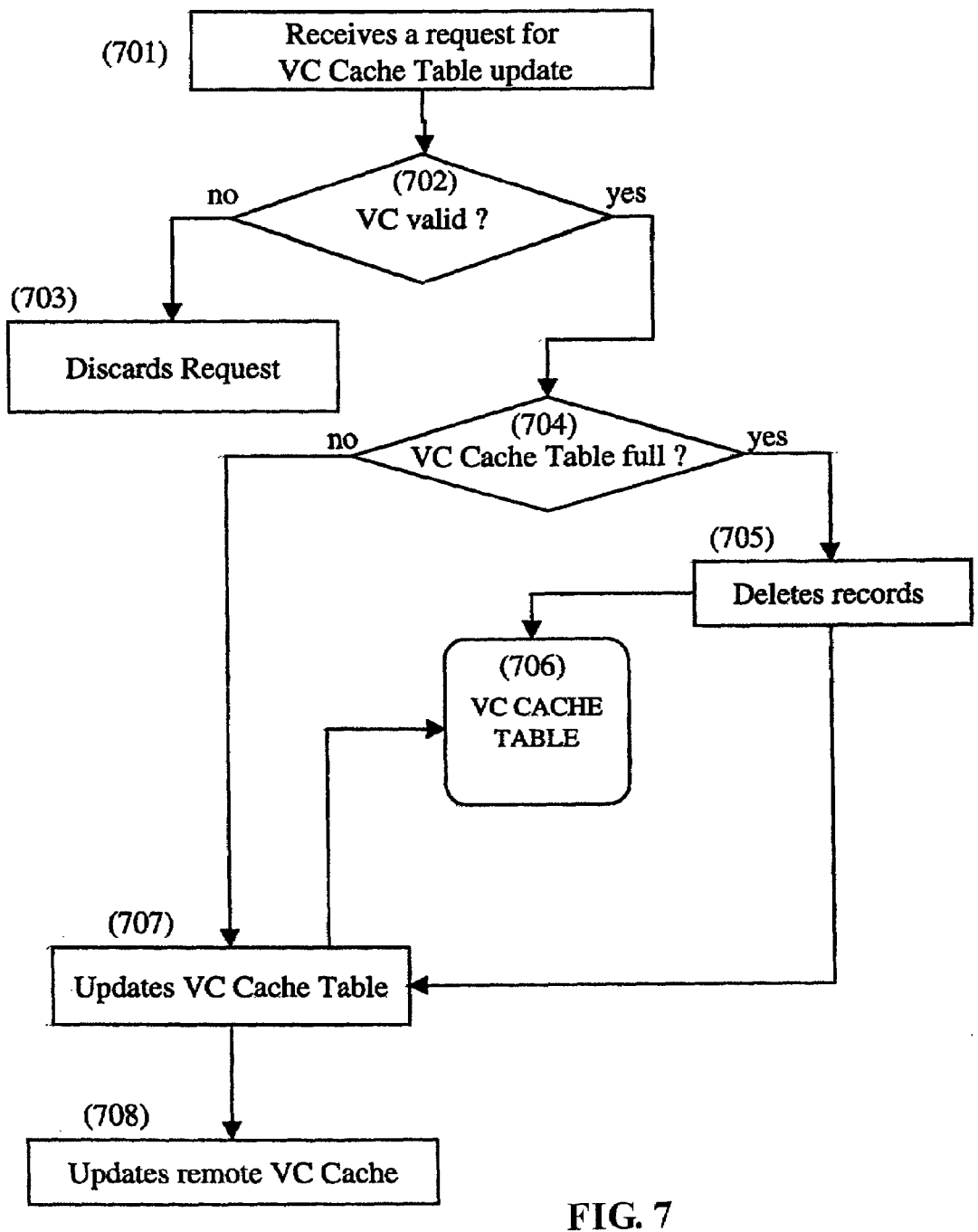
FIG. 7 describes the internal logic of the Virus-free Certificate Cache for updating a Virus-free Certificate according to the present invention.

FIG. 7 is a flow chart which refers to the internal logic of the Virus-free Certificate Cache (VCC) and more particularly to a method for processing a request to update the VC Cache Table. The Virus-free Certificate Cache Table (VCC):

(701): receives a request to update the VC Cache Table, with a VC associated with a particular file. Typically, said request for VC typically comprises:
The name, and the type of said file,
The size of the file (optionally),
The CRC of the file. This is a file signature which identifies the file.
The VC.
(702) tests whether or not the received VC is valid. The received VC is checked to be sure it is valid and has not been corrupted for instance by a malicious system sending corrupted VCs. Typically, the following VC validation is processed:
The VC is authenticated using its "certificate signature" file,
The VC "validity" is correct,
The VC has not been revoked.

If the received VC is valid:
(704) tests whether or not the VC Cache Table is full:
If the VC Cache Table is full:
(705) deletes some records of the VC Cache Table (706). Typically, the records which are deleted are selected according to the "Last_Date" and "Number_Hits" fields. For instance, the records having the oldest "Last_Date" and the lowest "Number_Hits" are deleted.
(707) updates the VC Cache Table (706), with the received VC. Either a new record is created in the VC Cache Table, or a new VC section is created in an existing record.
(708) updates one or multiple remote VC Caches. The VCC forwards the received request to one or multiple VC Caches. The address of said VC Caches is typically a predefined parameter of the VCC. This step is obviously bypassed when no remote VC Cache is defined.

If the VC Cache Table is not full:
Continues in step (707) to update the VC Cache Table with the received VC.

If the received VC is not valid:
(703) stores an information indicating that a request for VC Cache update has been received with an invalid VC, and discards the request.

Virus-free Certificate Proxy

The Virus-free Certificate Proxy (VCP) (107) acts as a single Virus-free Certificate Authority (VCA) within the LAN/WAN network in order to provide Virus-free Certificates to any system attached to the LAN/WAN network. When multiple VCAs are available (for instance, one VCA per software provider), the VCP identifies a VCA which has authority to build a Virus-free Certificate (VC) for a particular file, and retrieves said Virus-free Certificate (VC) from said identified VCA. A VC Proxy is a method and system for retrieving a VC for a particular file, from one or multiple VCAs. A VC Proxy processes requests for VCs (a request for VC is a request to retrieve one VC for a particular file). The method of processing each received request for VC comprises the steps of:
Identifying a VCA which has authority to build a VC for said particular file,
Retrieving said VC from said identified VCA,
When said requested VC has been retrieved, answering the received request for VC, with a positive response comprising said VC.

Furthermore, the step of identifying a VCA which has authority to build a VC for a particular file, comprises the further steps of:
- Retrieving the identifier of the VCA, using information comprised within the received request for VC, or
- Identifying the VCA using
  - information comprised within the received request for VC, and
  - information retrieved from a configured VC Proxy Table.
- If no VCA is identified:
  - Identifying a Virus-free Certificate Relay (VCR) system, which can provide the identifier of a VCA.
  - Retrieving from said identified Virus-free Certificate Relay (VCR) system, the identifier of a VCA which has authority to build said VC.
  - If no VCR system is identified,
    - identifying a configured default VCA using information retrieved from a configured VC Proxy Table.

Furthermore, the step of identifying a Virus-free Certificate Relay (VCR) system, which can provide the identifier of a VCA which has authority to build said VC, comprises the further steps of:
- Retrieving the identifier of a Virus-free Certificate Relay (VCR), from information comprised within said received request for VC, or
- Identifying a Virus-free Certificate Relay (VCR) system using information comprised within said received request for VC, and using information retrieved from a configured VC Proxy Table.

Furthermore, the step of retrieving said VC for said specific file from said identified VCA, consists in either:
- Retrieving the VC, using a short request sent to said identified VCA and which does not comprise said specific file; or
- Retrieving the VC, using a full request sent to said identified VCA and which comprises said specific file.

Typically, the VCP is either a dedicated network device attached to the LAN/WAN network, or an existing network device (for instance an existing WEB Server) which is enhanced to provide the VCP functions.

Virus-free Certificate Proxy Environment

Figure 8:
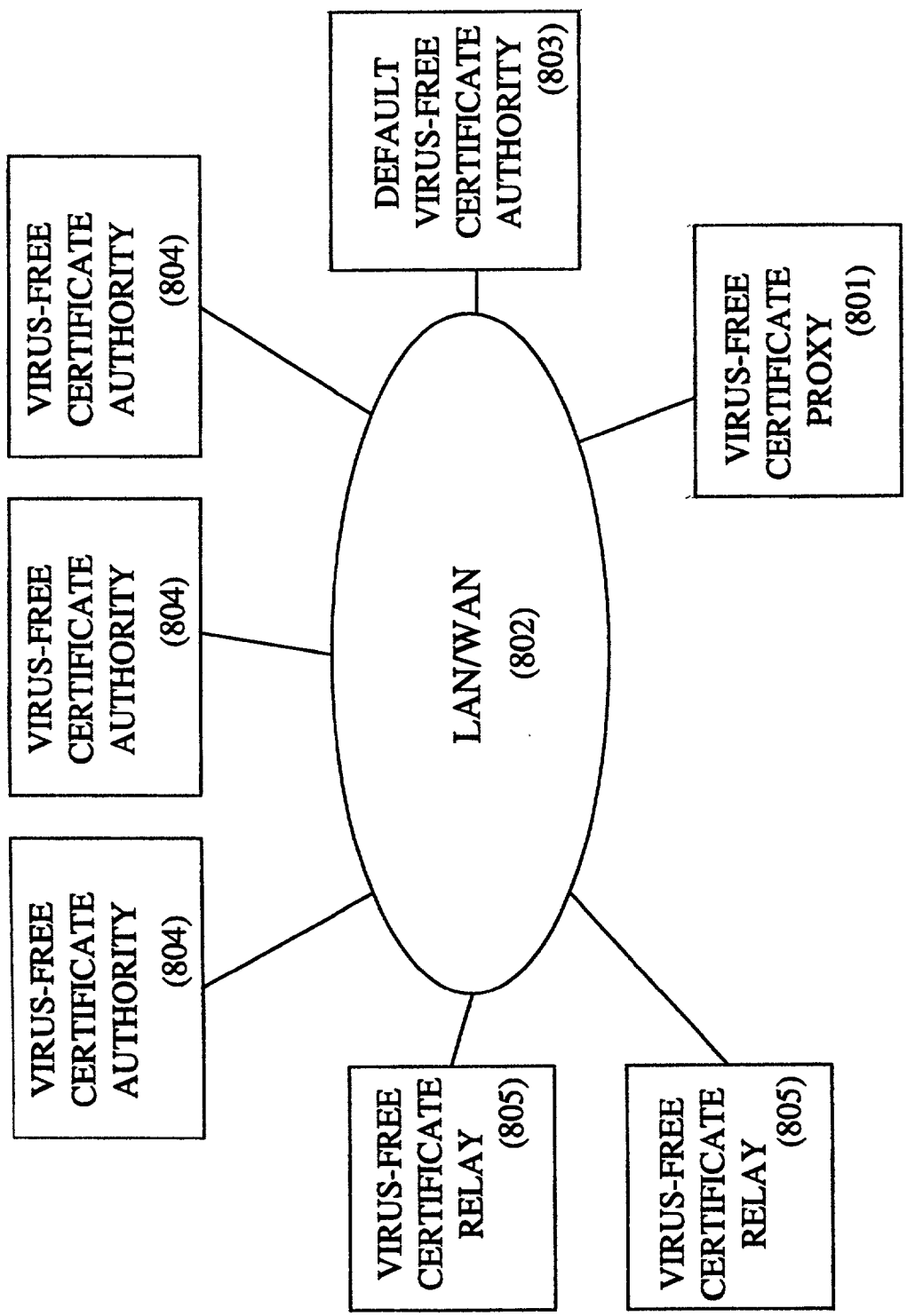
FIG. 8 describes the different anti-virus entities in a Virus-free Certificate Proxy environment according to the present invention.

FIG. 8 depicts the logical anti-virus entities involved in a VC Proxy environment. All the systems are attached to the LAN/WAN network (802). The WAN may be for instance the Internet network, or/and a company private Intranet network. One or multiple Virus-free Certificate Authorities (VCAs) (804) are attached to the LAN/WAN network (802). They have authority to build Virus-free Certificates (VCs). Typically, each VCA has authority to build the VCs associated with specific files. There can be:
- one VCA for each software provider (companies such as IBM, Symantec). For instance, IBM may provide and attach one VCA to the Internet, in order to build VCs associated with any file owned by IBM (for instance any software package such as "Host On Demand"). For instance, the Symantec company may attach one VCA to the Internet, in order to build a VC associated with any anti-virus product update (such as a virus signature file).
- one VCA for each company having authority to build VCs for files owned by other software providers. Such VCA builds VCs on behalf of software providers, for any or for specific files owned by said software providers. For instance, the VeriSign company may provide and attach one VCA to the Internet in order to build VCs for any (or specific) file owned by IBM.
- one VCA internal to the private Intranet network of a software provider. Such VCA has for instance authority to build the VC associated with specific or any file transmitted across the Intranet part of the LAN/WAN network.

In addition to these VCAs (804), one or multiple Default VCAs (803) may be attached to the LAN/WAN network. These Default VCAs have authority to build a VC for any file received by any system attached to the LAN/WAN network. Typically, when a system attached to the LAN/WAN network requires a VC for a particular file, and when no VCA (804) is explicitly identified, the Default VCA is used to build this VC.

Virus-free Certificate Relay

Software providers (for instance small companies) which do not provide their own VCA, may have an agreement with other companies providing VCAs. These software providers have to indicate the identifier of one or multiple VCAs having authority to build a VC associated with one or multiple files they own. This indication is then provided by a system called Virus-free Certificate Relay (VCR) (805).

A Virus-free Certificate Relay (VCR) (805) is therefore a system which provides the identifier of one or multiple VCAs having authority to build a VC for one or multiple files. Typically, a VCR is a File Server (for instance an FTP Server) which originates files owned by a software provider, and which indicates the VCA that can be used to build a VC associated with each file. For instance, a small software provider may indicate on its VCR (typically a FTP server) that the VCs associated with its software packages can be built by one specific VCA (for instance VeriSign). Any system requiring a VC for one of these software packages can then contact the indicated VCA to retrieve said VC.

Virus-free Certificate Proxy Table

Figure 9:
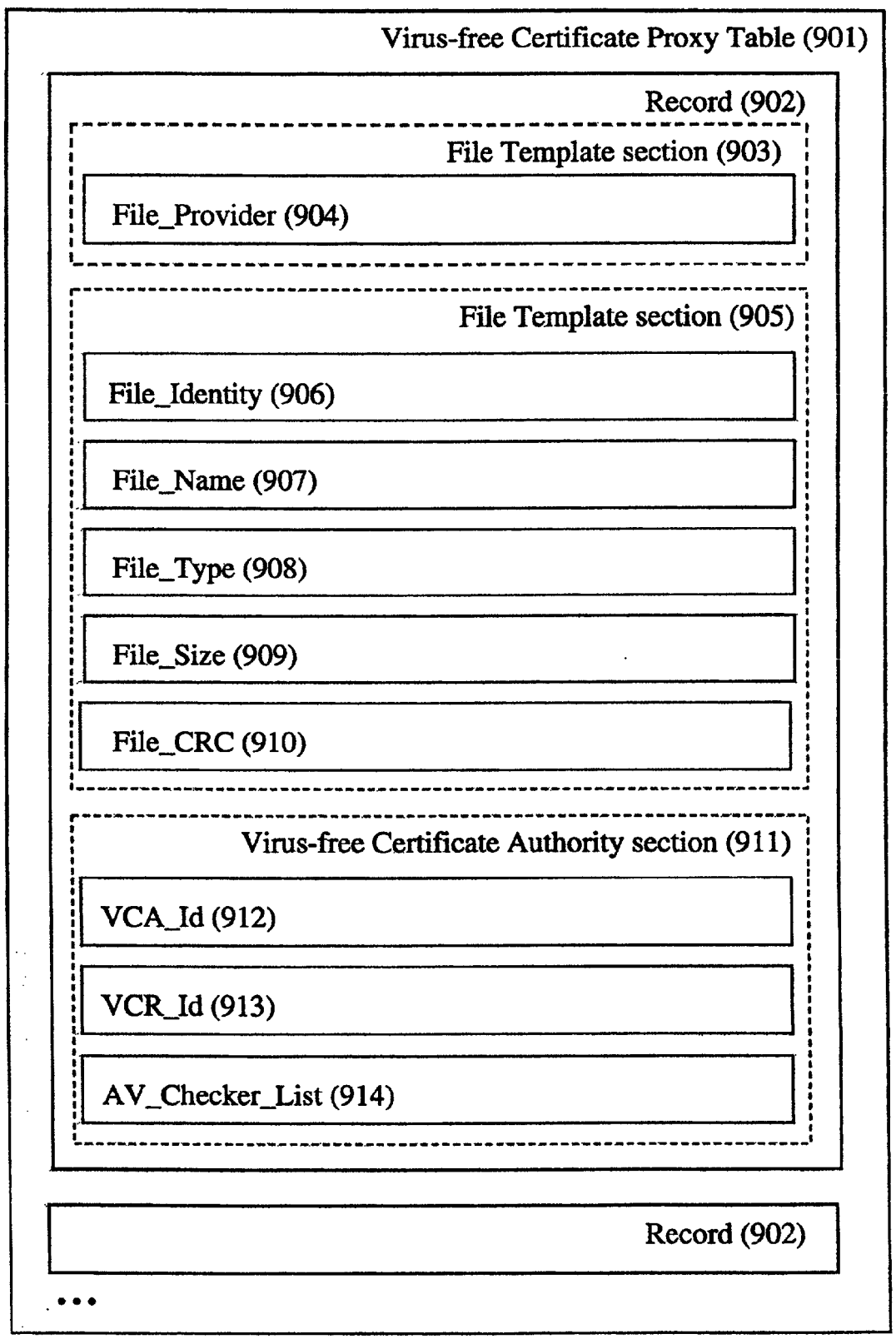
FIG. 9 describes the Virus-free Certificate Proxy Table according to the present invention.

FIG. 9 describes the table used by the Virus-free Certificate Proxy (VCP) (801). Said table (901) (a flat file in a preferred embodiment) is preferably created by the Network Administrator in charge of the LAN/WAN network. The Virus-free Certificate Proxy Table (901):
- associates each file provider (for instance any software provider such as IBM), with:
  - the identifier of one or multiple VCAs having authority to build one or multiple VCs associated with one or multiple files originated by said file provider.
  - the identifier of one or multiple VCRs capable of providing the identifier of one or multiple VCAs having authority to build one or multiple VCs associated with one or multiple files originated by said file provider.
- optionally associates one or multiple files, with:
  - the identifier of one or multiple VCAs having authority to build one or multiple VCs associated with each one of said files.
  - the identifier of one or multiple VCRs capable of providing the identifier of one or multiple VCAs having authority to build one or multiple VCs associated with each one of said files.

In the VC Proxy Table, each file provider is identified by its characteristics (903). These characteristics comprise:
The file provider identifier (typically its name).

Optionally, in the VC Proxy Table, each file (or group of files) is identified by its characteristics (905). These characteristics comprise:

The file identifier,

Optionally, the file name, the file type, the file size, and the file CRC.

In the VC Proxy Table, each file provider, and optionally each file (or group of files), is associated with one or multiple VCA sections. Each VCA section comprises the following information:

A VC Authority (VCA) identifier,

A VC Relay (VCR) identifier,

Optionally, a list of anti-virus programs and levels which are used by said VCA.

The table comprises a list of records (902). There is one record for each file provider, and optionally one record for each file (or group of files), each record comprising the following information:

(903) a File Provider section, which comprises the following information (fields in the record):

(904) File_Provider. This is the identifier of the software provider which originates one or multiple files. Typically, said identifier is the company name of the software provider (for instance IBM Corp.).

(905) an optional File Template section, which identifies one or multiple files having the same characteristics. Said characteristics comprise the following information (fields in the record):

(906) File_Identity. This is the identifier of one or multiple files within the file template, which has been originally created by the software provider when it has created said one or multiple files. Typically, said identifier is imbedded within each file by the file provider when the file is created. Said identifier typically comprises the original file name, version, and language.

(907) File_Name. This is the name of one or multiple files. The File_Name can be either:

an explicit file name which identifies a unique file. For instance a File_Name with the value "setup1" identifies the file called "setup1".

a wildcarded file name which identifies multiple files. For instance, File_Name with the value "setup*" identifies any file which name starts with "setup" (for instance "setup1", "setup_ok", . . . ).

(908) File_Type. This is the type of the file (for instance "exe", "doc", "avi", "html", . . . ). A File_Type identifies any file of this type. For instance, a File_Type with the value "exe" identifies all files which type is "exe" (for instance "start.exe", "word.exe", . . . ).

(909) File_Size. This is the size of the file.

(910) File_CRC. This is the CRC (a file signature) of the file.

In most cases, the File_Identity field provides sufficient information to identify in a unique way one file template. File_Name, File_Type, File_Size, and File_CRC are therefore optional in the File Template section. When File_Identity however, does not identify in a unique way a file template (or when the File_Identity cannot be retrieved for a specific file), the combination of File_Name and File_Type may identify in a unique way a file.

If multiple files have the same name and type (for instance, multiple "setup.exe" files originated from multiple sources), each file may then be differentiated in a unique way by its file size (for instance the size of one "setup.exe" is 2 kilobytes, and the size of another "setup.exe" is 4 kilobytes).

In the unlikely event of multiple files having the same name, type, and size, each file is then differentiated in a unique way by its file CRC which is the file signature.

(911) a Virus-free Certificate Authority (VCA) section, which comprises the following information (fields in the record):

(912) VCA_Id. This is the identifier of a VC Authority associated with the File Provider (and optionally with the file template), and which therefore has authority to build one or multiple VCs for each file originated by said File Provider. Typically, this is the IP address of the VCA.

(913) VCR_Id. This is the identifier of a VC Relay associated with the File Provider (and optionally with the file template), and which therefore can provide the identifier of one or multiple VCAs having authority to build a VC for one or multiple files originated by said File Provider. Typically, this is the IP address of the VCR.

(914) AV_Checker_List. This is the list of anti-virus programs and levels used by the VCA identified by VCA_Id when it builds VCs. This field is typically empty by default, which means that said list is unknown.

One record typically comprises one VCA section. However, one record possibly comprises multiple VCA sections, if one File Provider has multiple VCAs (for instance, one VCA per anti-virus program).

The VC Proxy Table comprises one default record, which comprises the identifier (VCA_Identifier) of a Default VCA. Possibly, multiple Default VCAs can be defined.

Internal Logic of the Virus-free Certificate Proxy

Figure 10A:
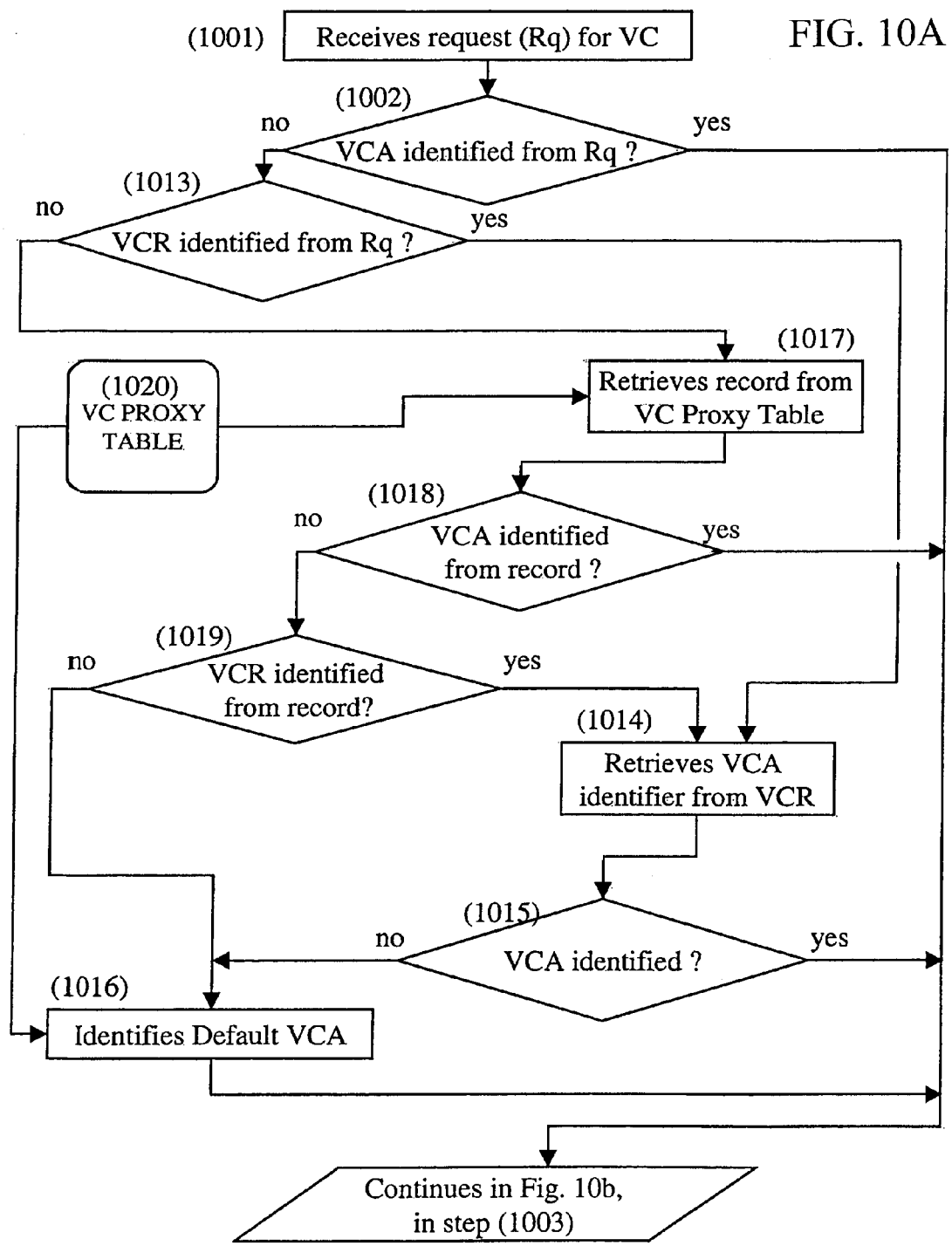
FIGS. 10a and 10b describe the internal logic of the Virus-free Certificate Proxy according to the present invention
Figure 10B:
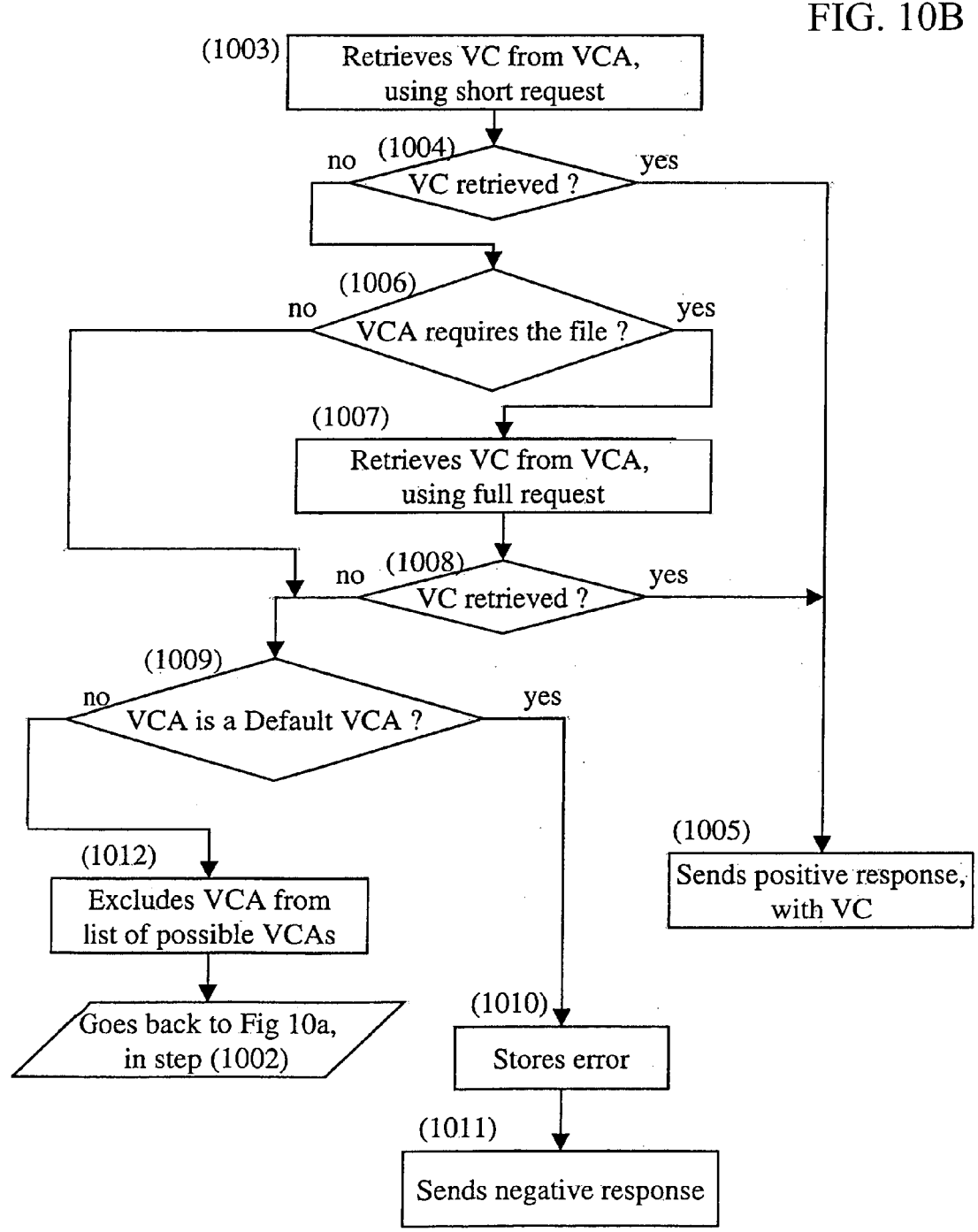

FIGS. 10*a* and 10*b* are flow charts which refer to the internal logic of the Virus-free Certificate Proxy (VCP). The VCP:

(1001): receives a request to retrieve a VC for a particular file. Typically, said request for VC comprises:

One particular file,

The name, and the type of this file,

A list of anti-virus programs and levels (referred to as "RCV_AV_Checker_List"), that must be used to build the VC. The list may be empty, which means that any anti-virus program and level can be used.

Optionally, a reduced VC which only comprises the "issuer" field (referred to as "RCV_issuer"), and which identifies the preferred VCA. Said reduced VC provides the VCP with some selection criteria which can be used when multiple VCs are available for the same file (typically, one VC available per VCA).

(1002) tests whether or not the identifier of a VCA that can be used to retrieve a VC, is comprised within the received request for VC. Said identifier is then referred to as "VCA_S_Id". Typically, said VCA identifier may be imbedded within the received file (for instance in the organization" section), or possibly derived from any information retrieved from the received request.

If VCA_S_Id is retrieved from information comprised within the received request:

(1003) retrieves one VC associated with the received file from the VCA identified by VCA_S_Id, using a short request. The VCP sends a short request to the VCA identified by VCA_S_Id, in order to retrieve a VC associated with the received file. Said short request does not comprise the received file, in order to minimize the traffic across the LAN/WAN network. Typically, said short request for VC comprises the following information:
The file name, and file type of the received file.
The size of the received file,
The CRC of the received file. Typically, the file CRC is calculated using the received file.
The list of anti-virus programs and levels that must be used by the VCA to build the VC. This list may be empty, which means that any anti-virus program and level can be used.
Typically, this list is the list which was received in the request ("RCV_AV_Checker_List"). Possibly, this list can also be a combination of "RCV_AV_Checker_List" and some configuration information of the VCP (for instance a Network Administrator may want to enforce a specific and updated list of anti-virus programs and levels that must be used to build the VC).
Typically, the VCA_S_Id comprises the address (for instance the IP address) of the VCA. Possibly, when no specific VCA can be identified in a unique way, said short request can be sent (broadcast) to all available VCAs.
(1004) tests whether or not a VC has been successfully retrieved from the VCA:
If a VC has been successfully retrieved from the VCA:
(1005) answers the received request for VC, with a positive response comprising the VC which has been retrieved. Optionally, the VC is validated before being sent back in the response. The VCP then waits for the next request for VC.
If a VC has not been successfully retrieved from the VCA:
(1006) tests whether or not the VCA requires the received file to build the VC. This test uses information retrieved from the message which has been received from the VCA in response to the short request sent in (1003). Said information indicates whether or not the VCA requires the file to build the VC.
If the VCA requires the file to build the VC:
(1007) retrieves a VC associated with the received file from the VCA identified by VCA_S_Id, using a full request.
The VCP sends a full request to the VCA identified by VCA_S_Id, in order to retrieve a VC associated with the received file. This full request comprises the received file.
(1008) tests whether or not a VC has been successfully retrieved from the VCA:
If a VC has been successfully retrieved from the VCA:
(1005) answers the received request for VC, with a positive response comprising the VC which has been retrieved. Optionally, the VC is validated before it is sent back in the response. The VCP then waits for the next request for VC.
If a VC has not been successfully retrieved from the VCA:
(1009) tests whether or not the VCA is a Default VCA, and when the VCA is a Default VCA, whether or not another Default VCA is available. This test preferably uses an indication which is stored by the VCP when it identifies the VCA, and which is determined using the VCP Table (1020).
If the VCA is a Default VCA, and no other Default VCA is available:
(1010) stores an information indicating that the VCP has not been able to retrieve a VC associated with the particular file comprised within the received request for VC. Possibly, a notification is also sent to a Network Administrator.
(1011) answers the received request for VC, with a negative response which indicates that no VC has been retrieved. The VCP then waits for the next request for VC.
If the VCA is not a Default VCA, or if the VCA is a Default VCA but another Default VCA is available:
(1012) excludes the VCA identified by VCA_S_Id, from the list of VCAs which can possibly be used to retrieve a VC for the received request. Goes back to the identification of a VCA, in step (1002), since another VCA (typically a Default VCA) may be able to build the VC.
If the VCA does not requires the file to build the VC: The VCA is therefore not able to build the VC.
Continues in step (1009) to test if the VCA is a Default VCA.
If VCA_S_Id is not retrieved from information comprised within the received request:
(1013) tests whether or not the identifier of a VC Relay (VCR) is comprised within the received request for VC. Said identifier is then referred to as "VCR_S_Id". Typically, said VCR identifier may be imbedded within the received file (for instance in the organization" section), or possibly derived from any information retrieved from the received request.
If VCR_S_Id is retrieved from information comprised within the received request:
(1014) retrieves the identifier (VCA_S_Id) of a VCA which has authority to build a VC for the received file, from the VCR identified by VCR_S_Id. The VCP sends a short request to the VCR identified by VCR_S_Id, in order to retrieve the identifier (VCA_S_Id) of a VCA which has authority to build a VC for the received file. Typically, said short request comprises the following information:
The file name, and file type of the received file.
The size of the received file,
The CRC of the received file. Typically, the file CRC is calculated using the received file.
The list of anti-virus programs and levels that must be used by the VCA to build the VC. Possibly, said list is empty, which means that any anti-virus program and level can be used. Typically, said list is the list which was received in the request ("RCV_AV_Checker_List"). Possibly, said list can also be a combination of "RCV_AV_Checker_List" and some configuration information of the VCP (for instance a Network Administrator may want to enforce a specific and updated list of anti-virus programs and levels that must be used to build the VC). Typically, the VCR_S_Id comprises the address (for instance the IP address) of the VCR.
(1015) tests whether or not the identifier (VCA_S_Id) of a VCA has been retrieved from the VCR.
If the identifier (VCA_S_Id) of a VCA has been retrieved from the VCR:
Continues in step (1003) in order to retrieve a VC for the received file, from said identified VCA.
If the identifier (VCA_S_Id) of a VCA has not been retrieved from the VCR:
(1016) retrieves the identifier (VCA_S_Id) of a Default VCA, from the VCP Table (1020).

Continues in step (1003) in order to retrieve a VC for the received file, from said identified VCA.

If VCR_S_Id cannot be retrieved from information comprised within the received request:

(1017) retrieves one record (called "Record_S") from the VC Proxy Table. Said record is preferably identified by:

Its "File_Provider" field, which must be equal to (or must comprise) either:

the "RCV_issuer" which has been received in the request for VC, or the file provider identifier which is possibly imbedded in the file.

Possibly, said record can also be identified by:

Its "File_Identity" field, which must be equal (or must comprise) the file identifier retrieved from the file.

Optionally, its "File_Name", "File_Type", "File_Size" and "File_CRC" which must be equal to respectively) the name, type, size, and CRC of received file.

At least a Default record can be identified.

(1018) tests whether or not the identifier of a VCA that can be retrieved from the VCP Table. A VCA section is primarily selected within "Record_S". Preferably, the selected VCA section is a section which "AV_Checker_List" is equal to (or comprises) "RCV_AV_Checker_List". The identifier of a VCA can be retrieved from the VCP Table, when said selected VCA section comprises a VCA Identifier in its "VCA_Id" field.

If the identifier (called VCA_S_Id) of a VCA can be retrieved from the VCP Table:

Continues in step (1003) in order to retrieve a VC for the received file, from said identified VCA.

If the identifier of a VCA cannot not be retrieved from the VCP Table:

(1019) tests whether or not the identifier of a VCR that can be retrieved from the VCP Table. A VCA section is primarily selected within "Record_S". Preferably, the selected VCA section is a section which "AV_Checker_List" is equal to (or contains) "RCV_AV_Checker_List". The identifier of a VCR can be retrieved from the VCP Table, when said selected VCA section comprises a VCR Identifier in its "VCR_Id" field.

If the identifier (called VCR_S_Id) of a VCR can be retrieved from the VCP Table:

Continues in step (1014) in order to retrieve, from the VCR identified by VCR_S_Id, the identifier of a VCA which has authority to build a VC for the received file.

If the identifier of a VCR cannot be retrieved from the VCP Table:

Continues in step (1016) in order to retrieve the identifier (VCA_S_Id) of a Default VCA, from the VCP Table (1020).

Advantages

The present invention provides a faster and more efficient way of detecting viruses, within a network device such as an IP Router or a Firewall.

The Virus-free Certificate Rules Table provides antivirus criteria at a central location, and enables a unique and coherent antivirus policy across the LAN/WAN network.

The full antivirus checking is only performed once on the VCA, instead of being performed on the Firewalls or IP Routers and/or on the client workstations.

The present method is in line with current security strategies based on a certificate authority and on certificates. The method can therefore be easily deployed across a LAN/WAN network.

While the invention has been particularly shown and described with reference to a preferred embodiment, it will be understood that various changes in form and detail may be made therein without departing from the spirit, and scope of the invention. Thus, the present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for use in a virus-free certificate firewall in controlling and filtering files using a virus-free certificate, the method comprising the steps of:

the firewall receiving a file;

if a virus-free certificate is required for the file, searching through at least one cache of stored virus-free certificates to determine whether one of the stored virus-free certificates corresponds to the file;

if a stored virus-free certificate is found which corresponds to the file, authenticating the corresponding stored virus-free certificate, said corresponding stored virus-free certificate comprising a certificate signature;

if the corresponding stored virus-free certificate is authenticated, determining whether the file is virus-free or not;

if the file is virus-free, forwarding the file with the corresponding stored virus-free certificate;

if the corresponding stored virus-free certificate is not authenticated or if no corresponding stored virus-free certificate associated with the file is found, determining whether the file is virus-free;

if the file is virus-free, associating with the file a new virus-free certificate, storing the new virus-free certificate, and forwarding the file with the new virus-free certificate.

2. The method according to claim 1, further comprising the steps of:

identifying the file in a table, said table comprising for each identified file at least one anti-virus criteria;

referring to the table and retrieving at least one of said at least one anti-virus criteria,; and determining from said at least one anti-virus criteria whether a virus-free certificate is required for the file or not.

3. The method according to claim 2, wherein the step of referring to the table and retrieving at least one of said at least one anti-virus criteria includes the step of determining whether or not the identified file satisfies requirements of the retrieved anti-virus criteria.

4. The method according to claim 1, wherein the virus-free certificate comprises a file signature for determining that the file is virus-free.

5. The method according to claim 1, wherein the virus-free certificate includes a list of anti-virus programs that have been executed on the file.

6. The method according to claim 1, wherein the virus-free certificate further comprises at least one of the following:

a file identification;

a virus-free certificate authority identification;

a public key for decrypting the file signature;

a certificate signature for authenticating the virus-free certificate; and an indication of the virus-free certificate validity.

7. The method according to claim 1, wherein said step of determining whether the file is virus-free or not includes:

decrypting the file signature using a public key comprised in the virus-free certificate;

hashing the file to generate a file digest; and comparing the decrypted file signature with the generated file digest.

8. The method according to claim 1, wherein said step of determining whether the file is virus-free or not comprises the further step of if the file is not virus-free, discarding the file.

9. The method according to claim 1, wherein the step of authenticating the virus-free certificate includes:

validating the virus-free certificate, the virus-free certificate including a list of at least one anti-virus program that has been executed on the file;

identifying the file in a table, said table comprising for each identified file at least one anti-virus criteria; and verifying that the list of said at least one anti-virus program comprised in the virus-free certificate is included in a list of anti-virus programs associated with the file in the table.

10. The method according to claim 1, wherein the step of associating with the file a new virus-free certificate includes the step of requesting a virus-free certificate to a virus-free certificate authority.

11. The method according to claim 1, wherein the step of associating with the file a new virus-free certificate includes the step of retrieving a virus-free certificate from a cache, said cache storing existing virus-free certificates.

12. The method according to claim 1, wherein the step of forwarding the file with the new virus-free certificate includes updating a cache with the new virus-free certificate.

13. A system for controlling and filtering files using a virus-free certificate, the system comprising a firewall operative: (i) to receive a file; (ii) if a virus-free certificate is required for the file, to search through at least one cache of stored virus-free certificates to determine whether one of the stored virus-free certificates corresponds to the file; (iii) if a stored virus-free certificate is found which corresponds to the file, to authenticate the corresponding stored virus-free certificate, said corresponding stored virus-free certificate comprising a certificate signature; (iv) if the corresponding stored virus-free certificate is authenticated, to determine whether the file is virus-free or not; (v) if the file is virus-free, to forward the file with the corresponding stored virus-free certificate; (vi) if the corresponding stored virus-free certificate is not authenticated or if no corresponding stored virus-free certificate associated with the file is found, to determine whether the file is virus-free; and (vii) if the file is virus-free, to associate with the file a new virus-free certificate, to store the new virus-free certificate, and to forward the file with the new virus-free certificate.

14. An article of manufacture comprising a computer usable medium having computer readable program code means embodied therein for causing employment of a virus-free certificate firewall, the computer readable program code means in said article of manufacture comprising one or more programs which when executed implement the steps of:

receiving a file;

if a virus-free certificate is required for the file, searching through at least one cache of stored virus-free certificates to determine whether one of the stored virus-free certificates corresponds to the file;

if a stored virus-free certificate is found which corresponds to the file, authenticating the corresponding stored virus-free certificate, said corresponding stored virus-free certificate comprising a certificate signature;

if the corresponding stored virus-free certificate is authenticated, determining whether the file is virus-free or not;

if the file is virus-free, forwarding the file with the corresponding stored virus-free certificate;

if the corresponding stored virus-free certificate is not authenticated or if no corresponding stored virus-free certificate associated with the file is found, determining whether the file is virus-free; and if the file is virus-free, associating with the file a new virus-free certificate, storing the new virus-free certificate, and forwarding the file with the new virus-free certificate.

15. A computer program product comprising a computer usable medium having computer readable program code means embodied therein for causing employment of a virus-free certificate firewall, the computer readable program code means in said computer program product comprising computer readable program code which when executed causes a computer to effect the steps of:

receiving a file;

if a virus-free certificate is required for the file, searching through at least one cache of stored virus-free certificates to determine whether one of the stored virus-free certificates corresponds to the file;

if a stored virus-free certificate is found which corresponds to the file, authenticating the corresponding stored virus-free certificate, said corresponding stored virus-free certificate comprising a certificate signature;

if the corresponding stored virus-free certificate is authenticated, determining whether the file is virus-free or not;

if the file is virus-free, forwarding the file with the corresponding stored virus-free certificate;

if the corresponding stored virus-free certificate is not authenticated or if no corresponding stored virus-free certificate associated with the file is found, determining whether the file is virus-free; and if the file is virus-free, associating with the file a new virus-free certificate, storing the new virus-free certificate, and forwarding the file with the new virus-free certificate.

16. A program storage device readable by machine, tangibly embodying a program of instructions executable by the machine to perform method steps for employment of a virus-free certificate firewall, said method steps comprising the steps of:

receiving a file;

if a virus-free certificate is required for the file, searching through at least one cache of stored virus-free certificates to determine whether one of the stored virus-free certificates corresponds to the file;

if a stored virus-free certificate is found which corresponds to the file, authenticating the corresponding stored virus-free certificate, said corresponding stored virus-free certificate comprising a certificate signature;

if the corresponding stored virus-free certificate is authenticated, determining whether the file is virus-free or not;

if the file is virus-free, forwarding the file with the corresponding stored virus-free certificate;

if the corresponding stored virus-free certificate is not authenticated or if no corresponding stored virus-free certificate associated with the file is found, determining whether the file is virus-free; and if the file is virus-free, associating with the file a new virus-free certificate, storing the new virus-free certificate, and forwarding the file with the new virus-free certificate.

* * * * *

UNITED STATES PATENT AND TRADEMARK OFFICE
CERTIFICATE OF CORRECTION

PATENT NO. : 6,986,051 B2
DATED : January 10, 2006
INVENTOR(S) : J-F. Le Pennec et al.

It is certified that error appears in the above-identified patent and that said Letters Patent is hereby corrected as shown below:

<u>Title page,</u>
Item [30], Foreign Application Priority Data, delete "Jan. 6, 2000" and insert -- April 13, 2000 -- ; and delete "(EP)" and insert -- (FR) --; delete "00480003" and insert -- 00480003.3 --.

<u>Column 13,</u>
Line 51, start a new paragraph with "Possibly".

<u>Column 22,</u>
Line 31, start a new paragraph with "For".

Signed and Sealed this

Twenty-first Day of March, 2006

JON W. DUDAS
*Director of the United States Patent and Trademark Office*